(12) United States Patent
Lim et al.

(10) Patent No.: US 9,268,164 B2
(45) Date of Patent: Feb. 23, 2016

(54) LIQUID CRYSTAL DISPLAY AND MANUFACTURING METHOD THEREOF

(71) Applicant: Samsung Display Co., Ltd., Yongin (KR)

(72) Inventors: Tae Woo Lim, Hwaseong-si (KR); Kyung Tae Chae, Hwaseong-si (KR); Sung Hwan Won, Suwon-si (KR); Seon Uk Lee, Seongnam-si (KR); Jun Heui Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 35 days.

(21) Appl. No.: 14/209,263

(22) Filed: Mar. 13, 2014

(65) Prior Publication Data

US 2014/0267984 A1    Sep. 18, 2014

(30) Foreign Application Priority Data

Mar. 13, 2013  (KR) .................. 10-2013-0026848

(51) Int. Cl.
*G02F 1/1333* (2006.01)
(52) U.S. Cl.
CPC ................. *G02F 1/133377* (2013.01)
(58) Field of Classification Search
CPC .................. G02F 1/133377; G02F 1/1341
See application file for complete search history.

(56) References Cited

U.S. PATENT DOCUMENTS

| | | | |
|---|---|---|---|
| 2013/0250220 A1* | 9/2013 | Kim et al. | 349/123 |
| 2014/0009709 A1* | 1/2014 | Lim et al. | 349/43 |
| 2014/0132867 A1* | 5/2014 | Cho et al. | 349/42 |
| 2014/0192302 A1* | 7/2014 | Kim et al. | 349/106 |

* cited by examiner

*Primary Examiner* — Richard Kim
*Assistant Examiner* — Ryan Crockett
(74) *Attorney, Agent, or Firm* — Cantor Colburn LLP

(57) ABSTRACT

A manufacturing method of a liquid crystal display includes: providing a pixel electrode on an insulation substrate; providing a sacrificial layer on the pixel electrode; providing a common electrode on the sacrificial layer; providing a photoresist layer on the common electrode; exposing a portion of the photoresist layer, common electrode and the sacrificial layer with light; developing the portion of the photoresist layer exposed with the light; etching a layer between the photoresist layer and the sacrificial layer using the developed photoresist layer as a mask to expose the portion of the sacrificial layer exposed with the light; removing the portion of the sacrificial layer exposed with the light; providing a roof layer on the insulation substrate and etching the roof layer to form a liquid crystal injection hole therein; and removing the sacrificial layer exposed through the liquid crystal injection hole to form a microcavity.

12 Claims, 37 Drawing Sheets

LIQUID CRYSTAL DISPLAY AND MANUFACTURING METHOD THEREOF

This application claims priority to Korean Patent Application No. 10-2013-0026848 filed on Mar. 13, 2013, and all the benefits accruing therefrom under 35 U.S.C. §119, the content of which in its entirety is herein incorporated by reference.

BACKGROUND 1. (a) Field

The invention relates to a liquid crystal display and a manufacturing method of the liquid crystal display, and more particularly, to a liquid crystal display having a liquid crystal layer in a microcavity, and a manufacturing method of the liquid crystal display.

2. (b) Description of the Related Art

A liquid crystal display, which is one of the most widely used type of flat panel display device, typically includes two display panels where field generating electrodes such as a pixel electrode and a common electrode are provided, and a liquid crystal layer interposed between the two display panels.

The liquid crystal display generates an electric field in the liquid crystal layer by applying voltages to the field generating electrodes to determine orientations of liquid crystal molecules of the liquid crystal layer and control polarization of incident light, thereby displaying an image.

A liquid crystal display having an embedded microcavity ("EM") structure (e.g., nanocrystal structure) is a display device manufactured by providing a sacrificial layer with a photoresist, removing the sacrificial layer after coating a support member thereon, and filling a liquid crystal in an empty space provided by removing the sacrificial layer.

In such a liquid crystal display, when developing the sacrificial layer or performing a heat treatment for an overlying layer, a characteristic thereof may be changed such that the sacrificial layer may partially remain in the space to be filled by the liquid crystal when removing the sacrificial layer. Also, the common electrode may have a curved structure according to the sacrificial layer such that the common electrode may be disposed substantially close to the underlying pixel electrode.

SUMMARY

Exemplary embodiments of the invention relate to a liquid crystal display including a microcavity having a substantially uniform cell gap and a manufacturing method of the liquid crystal display. Exemplary embodiments of the invention relate to a liquid crystal display, in which a common electrode and a pixel electrode have a substantially uniform distance therebetween, and a manufacturing method of the liquid crystal display.

An exemplary embodiment of a manufacturing method of a liquid crystal display according to the invention includes: providing a pixel electrode on an insulation substrate; providing a sacrificial layer on the pixel electrode; providing a common electrode on the sacrificial layer; providing a photoresist layer on the common electrode; exposing a portion of the photoresist layer, common electrode and the sacrificial layer with light; developing the portion of the photoresist layer exposed with the light; etching a layer between the photoresist layer and the sacrificial layer using the developed photoresist layer as a mask to expose the portion of the sacrificial layer exposed with the light; removing the portion of the sacrificial layer exposed with the light; providing a roof layer on the insulation substrate and etching the roof layer to form a liquid crystal injection hole therein; and removing the sacrificial layer exposed through the liquid crystal injection hole to form a microcavity.

In an exemplary embodiment, the method may further includes providing a lower insulating layer between the common electrode and the photoresist layer, where the sacrificial layer, the common electrode and the photoresist layer cover the pixel electrode on the substrate.

In an exemplary embodiment, the portion of the sacrificial layer exposed with the light may correspond to the liquid crystal injection hole and a column portion of the roof layer.

In an exemplary embodiment, the etching the layer between the photoresist layer and the sacrificial layer using the developed photoresist layer as a mask may include: etching the lower insulating layer using the developed photoresist layer as a mask; removing the photoresist layer; and etching the common electrode using the etched lower insulating layer as a mask to expose the portion of the sacrificial layer exposed with the light.

In an exemplary embodiment, the method may further include providing an additional lower insulating layer on the substrate, before the providing the roof layer on the substrate and the etching the roof layer to form the liquid crystal injection hole therein and after removing the portion of the sacrificial layer exposed with the light.

In an exemplary embodiment, the providing the roof layer on the substrate and the etching the roof layer to form the liquid crystal injection hole therein may include: the providing the roof layer on the substrate; exposing a portion of the provided roof layer corresponding to the removed portion of the sacrificial layer with light; developing the portion of the roof layer exposed with the light; providing an upper insulating layer on the substrate to cover the developed roof layer; and removing a portion of the upper insulating layer corresponding to the removed portion of the sacrificial layer to form the liquid crystal injection hole.

In an exemplary embodiment, the etching the layer between the photoresist layer and the sacrificial layer using the developed photoresist layer as a mask may include: etching the common electrode using the developed photoresist layer as a mask to expose the portion of the sacrificial layer exposed with the light; and removing the photoresist layer.

In an exemplary embodiment, the removing the photoresist layer may include using an ashing process, and the exposed portion of the sacrificial layer may be partially removed by the ashing process.

In an exemplary embodiment, the removed portion of the sacrificial layer by the ashing process may be positioned under the common electrode.

In an exemplary embodiment, the method may further include providing an additional lower insulating layer on the substrate, before the providing the roof layer on the substrate and the etching the roof layer to form the liquid crystal injection hole therein and after the removing the portion of the sacrificial layer exposed with the light.

In an exemplary embodiment, the providing the roof layer on the substrate and the etching the roof layer to form the liquid crystal injection hole therein may include: the providing the roof layer on the substrate; exposing a portion of the provided roof layer corresponding to the removed portion of the sacrificial layer with light; developing the portion of the roof layer with the light; providing an upper insulating layer on the substrate to cover the developed roof layer; and removing a portion of the upper insulating layer corresponding to the removed portion of the sacrificial layer to form the liquid crystal injection hole.

In an exemplary embodiment, the exposed portion of the sacrificial layer may correspond to the liquid crystal injection hole and a column portion of the roof layer.

An exemplary embodiment of a liquid crystal display according to the invention includes: an insulation substrate; a pixel electrode disposed on the insulation substrate; a plurality of microcavities defined on the pixel electrode; a plurality of common electrodes disposed on the microcavities, respectively; a roof layer which covers the common electrodes and the microcavities and includes a column portion; and a liquid crystal layer disposed in the microcavity, where adjacent microcavities are connected to each other.

In an exemplary embodiment, the column portion of the roof layer may extend substantially in a first direction and may be disposed between the microcavities, and an empty space may be defined in the column portion, and the microcavities may be connected through the empty space in the column portion.

In an exemplary embodiment, a liquid crystal injection hole may be defined between the microcavities adjacent to each other in the first direction, and the liquid crystal injection hole may be exposed by the roof layer.

In an exemplary embodiment, the common electrodes adjacent to each other in a second direction, which is substantially perpendicular to the first direction, may be connected to each other through the empty space in the column portion of the roof layer.

In an exemplary embodiment, the liquid crystal display may further include a lower insulating layer disposed between the roof layer and the common electrode.

In an exemplary embodiment, the lower insulating layer may have a pattern corresponding to the common electrodes.

In an exemplary embodiment, the liquid crystal display may further include an additional lower insulating layer disposed between the lower insulating layer and the roof layer.

In an exemplary embodiment, the liquid crystal display may further include an upper insulating layer which encloses upper and side surfaces of the roof layer.

In exemplary embodiments, the influence of the developing treatment or the heat treatment is not performed before removing the sacrificial layer such that the sacrificial layer is substantially entirely removed during a process for removing the sacrificial layer, and the cell gap of the microcavity is thereby substantially uniformly maintained. In such exemplary embodiments, the common electrode is provided only on the microcavity and spaced apart from the pixel electrode at a predetermined distance such that a short circuit between the common electrode and the pixel electrode is effectively prevented.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
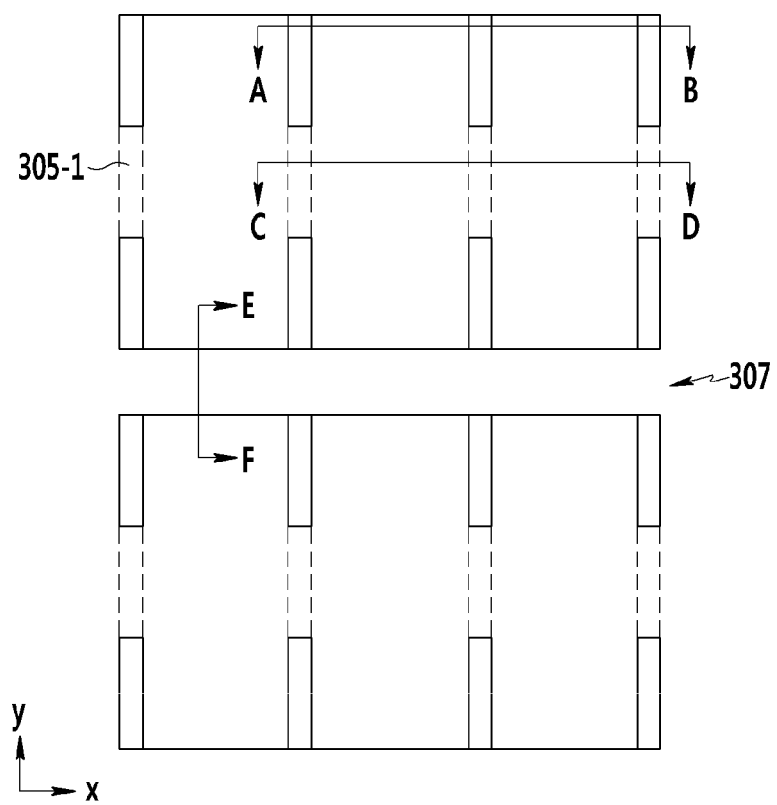
FIG. 1 is a top plan view of pixels of an exemplary embodiment of a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

Now, an exemplary embodiment of a liquid crystal display according to the invention will be described with reference to FIG. 1 to FIG. 4.

Figure 2:
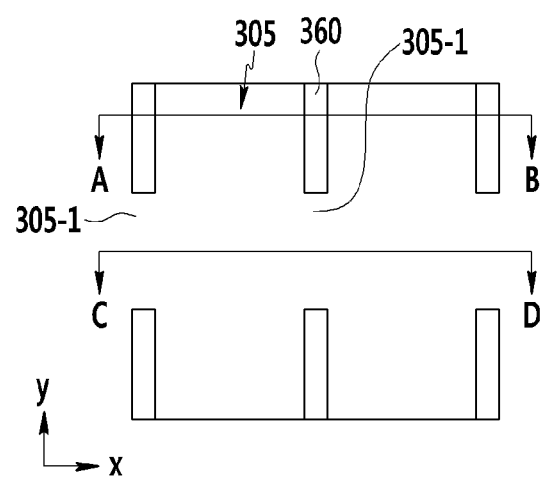
FIG. 2 is a top plan view of a portion of the pixels of FIG. 1.
Figure 3:
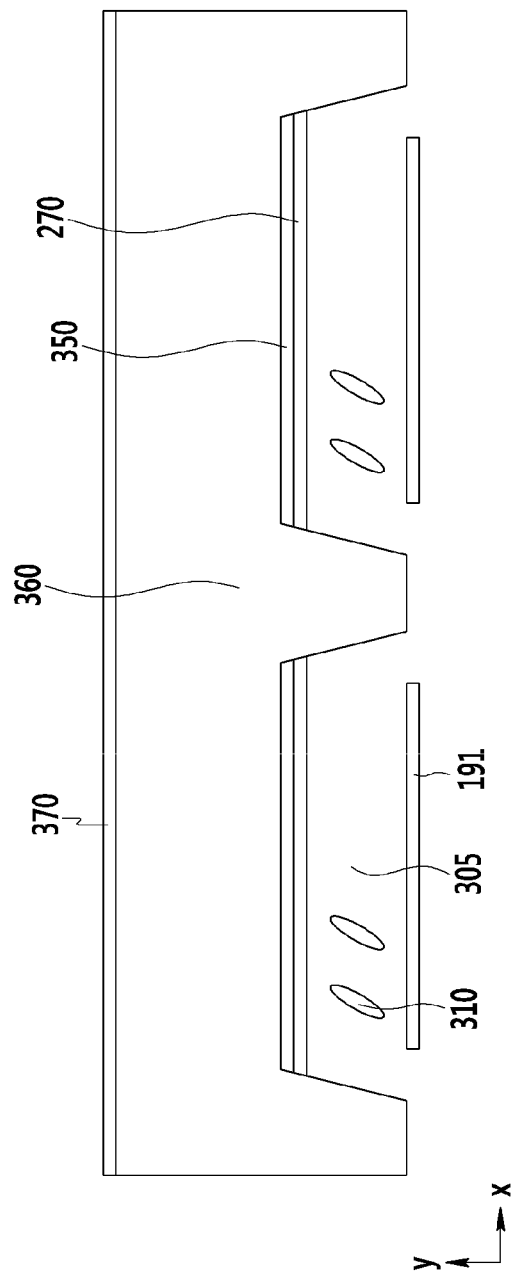
FIG. 3 is a cross-sectional view taken along line A-B of FIG. 1 and FIG. 2.
Figure 4:
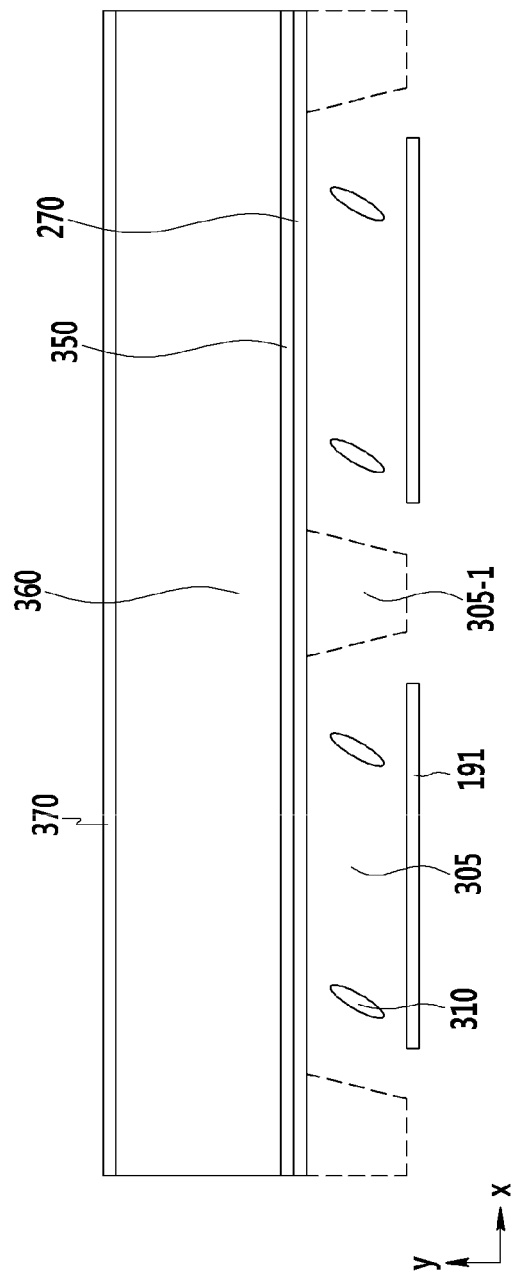
FIG. 4 is a cross-sectional view taken along line C-D of FIG. 1 and FIG. 2.

FIG. 1 is a top plan view of pixels in an exemplary embodiment of a liquid crystal display according to the invention in a view top, FIG. 2 is a top plan view of a portion of the pixels of FIG. 1, FIG. 3 is a cross-sectional view taken along line A-B of FIG. 1 and FIG. 2, and FIG. 4 is a cross-sectional view taken along line C-D of FIG. 1 and FIG. 2.

In an exemplary embodiment of a liquid crystal display according to the invention, a liquid crystal layer is disposed in a microcavity 305 on an insulation substrate, and an opposing substrate is omitted. Hereinafter, a microcavity and a structure thereof in an exemplary embodiment will be described in detail, and structures of wiring under the microcavity and electrodes in such an embodiment is not limited to a specific structures, but may have various structures.

FIG. 1 and FIG. 2 are top plan views showing the pixels in an exemplary embodiment of the liquid crystal display, and the structure of the wiring and the electrode are not shown therein. The structure of the wiring and the electrode in the pixels may be various, and the structure of the wiring and the electrode in an exemplary embodiment will be described later in detail with reference to FIG. 37.

Now, a pixel electrode 191, the microcavity 305 and overlying layers will be described.

In an exemplary embodiment, the microcavity 305 is supported by a roof layer 360. The roof layer 360 includes a portion positioned on the microcavity 305 and a column portion positioned at a side of the microcavity 305. In FIG. 1 and FIG. 2, the column portion of the roof layer 360 is indicated by a quadrangular solid line. Also, an empty portion 305-1 in the column portion of the roof layer 360 indicated by a dotted line in FIG. 1 is a portion where the column portion of the roof layer 360 is removed. The microcavity 305 is defined between adjacent column portions of the roof layer 360.

The roof layer 360 is divided into a lower portion and an upper portion with reference to a liquid crystal injection hole 307. A pixel may be defined by adjacent microcavities 305 in a first direction (e.g., a y-direction) and positioned upwardly and downwardly with respect to the liquid crystal injection hole 307, respectively, or may be defined by a single microcavity 305.

The microcavity 305 positioned upwardly or downwardly with respect to the liquid crystal injection hole 307 is connected to microcavities 305 disposed adjacent thereto in the second direction, e.g., the x-direction. Referring to FIG. 1 and FIG. 2 as well as FIG. 4 which is a cross-sectional view taken line C-D of FIG. 1 and FIG. 2, the microcavities 305 disposed adjacent to each other in the x-direction are connected by the empty portion 305-1 in the column portion of the roof layer 360. In an exemplary embodiment, a common electrode 270 is connected to each other in the x-direction through an upper portion of the empty portion 305-1 in the column portion of the roof layer 360. The empty portion 305-1 in the column portion of the roof layer 360 between adjacent microcavities 305 is also referred to as a connection 305-1 of the adjacent microcavities 305.

In an exemplary embodiment, a thin film transistor of the pixel may be disposed in a region where the liquid crystal injection hole 307 is defined.

FIG. 2 shows the microcavity 305 positioned at one side of the liquid crystal injection hole 307 in FIG. 1. The cross-sectional view taken line A-B of FIG. 2 is shown in FIG. 3, and the cross-sectional view taken line C-D of FIG. 2 is shown in FIG. 4.

Referring to FIG. 2 to FIG. 4, an upper structure of the pixel electrode 191 in the pixel of an exemplary embodiment will be described.

In an exemplary embodiment, a passivation layer (not shown) is disposed on the thin film transistor (not shown) and the wiring (not shown) on a substrate (not shown), and the pixel electrode 191 is disposed on the passivation layer. The pixel electrode 191 may include a transparent conductive material such as indium tin oxide ("ITO") or indium zinc oxide ("IZO"), for example. The pixel electrode 191 receives a data voltage from the thin film transistor through a contact hole.

The microcavity 305 is defined on the passivation layer and the pixel electrode 191. The liquid crystal layer including liquid crystal molecules 310 is disposed in the microcavity 305.

An upper surface of the microcavity 305 is substantially horizontal with respect to the substrate, and a side surface of the microcavity 305 is tapered. The microcavity 305 is a space provided by removing a sacrificial layer during a manufacturing process, and the common electrode 270 and a lower insulating layer 350 are disposed on the microcavity 305. In an exemplary embodiment, as shown in FIG. 3, the common electrode 270 may be disposed only at the upper surface of the microcavity 305.

In such an embodiment, as described above, the pixel electrode 191 and the passivation layer are positioned under the microcavity 305. The column portion of the roof layer 360 is positioned at the side surface of the microcavity 305. In such an embodiment, the microcavity 305 is the space defined by the common electrode 270, the pixel electrode 191, the passivation layer and the column portion of the roof layer 360.

The liquid crystal layer is disposed inside the microcavity 305, and an alignment layer (not shown) may be provided inside the microcavity 305 to arrange the liquid crystal molecules 310 of the liquid crystal layer in the microcavity 305. The alignment layer as a liquid crystal alignment layer may include a material such as polyamic acid, polysiloxane, or polyimide, for example.

The liquid crystal layer is disposed inside the microcavity 305 (e.g., in the alignment layer in the microcavity 305). The liquid crystal molecules 310 are initially arranged by the alignment layer, and an arrangement direction of the liquid crystal molecules 310 is changed by an electric field generated therein. A height of the liquid crystal layer corresponds to a height of the microcavity 305. The liquid crystal layer in the microcavity 305 is also referred to as a nanocrystal layer.

In an exemplary embodiment, the liquid crystal layer in the microcavity 305 may be provided, e.g., inserted, into the microcavity 305 using capillary force, and the alignment layer may be provided using the capillary force.

In the column portion of the roof layer 360 positioned between the adjacent microcavities 305, as shown in FIG. 4, the empty portion 305-1 is defined. In such an embodiment, the adjacent microcavities 305, the common electrode 270 and the lower insulating layer 350 on the microcavity 305 are connected to each other through the empty portion 305-1.

The common electrode 270 is disposed on the microcavity 305. The common electrode 270 is positioned at the upper surface of the microcavity 305 and is also disposed on the empty portion 305-1 in the column portion of the roof layer 360. In such an embodiment, adjacent common electrodes 270 are spaced apart from each other with respect to the liquid crystal injection hole 307. The common electrode 270 may include the transparent conductive material such as ITO or IZO, for example, and generates an electric field along with the pixel electrode 191, thereby controlling the arrangement direction of the liquid crystal molecules 310.

The lower insulating layer 350 is disposed on the common electrode 270. The lower insulating layer 350 may include an inorganic insulating material such as silicon nitride (SiNx), silicon oxide (SiOx) and silicon oxynitride (SiOxNy), for example. The lower insulating layer 350 is disposed only on the common electrode 270, thereby having substantially the same planar shape as the common electrode 270. In an exemplary embodiment, the lower insulating layer 350 may have an edge disposed along an edge of the common electrode 270. The lower insulating layer 350 is disposed on the upper surface of the microcavity 305 and the empty portion 305-1 in the column portion of the roof layer 360.

The roof layer 360 is disposed on the lower insulating layer 350. The roof layer 360 may support the microcavity 305 defined between the pixel electrode 191 and the common electrode 270, and may include a photoresist and various organic materials. The roof layer 360 includes the portion positioned on the microcavity 305 and the column portion positioned at the side of the microcavity 305. The column portion of the roof layer 360 extends substantially in a vertical direction (e.g., the first direction or the y-direction), and the column portion may not disposed in the empty portion 305-1 and the liquid crystal injection hole 307. In the roof layer 360, the portion positioned on the microcavity 305 may expose the liquid crystal injection hole 307.

Figure 20:
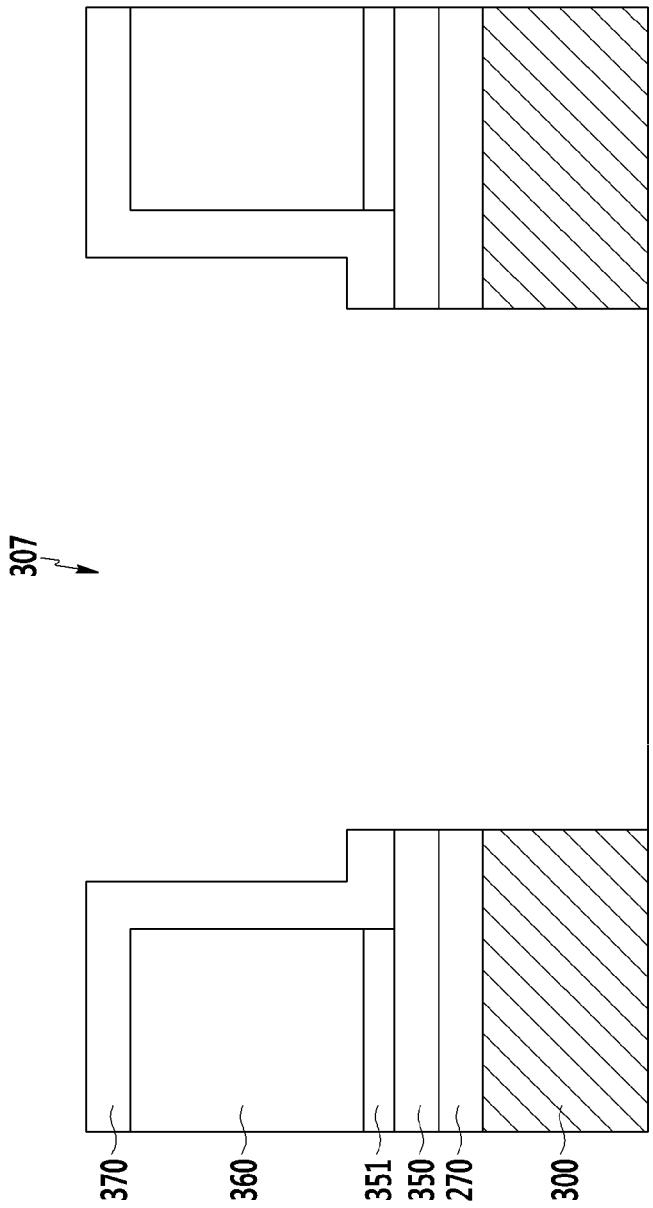
Figure 36:
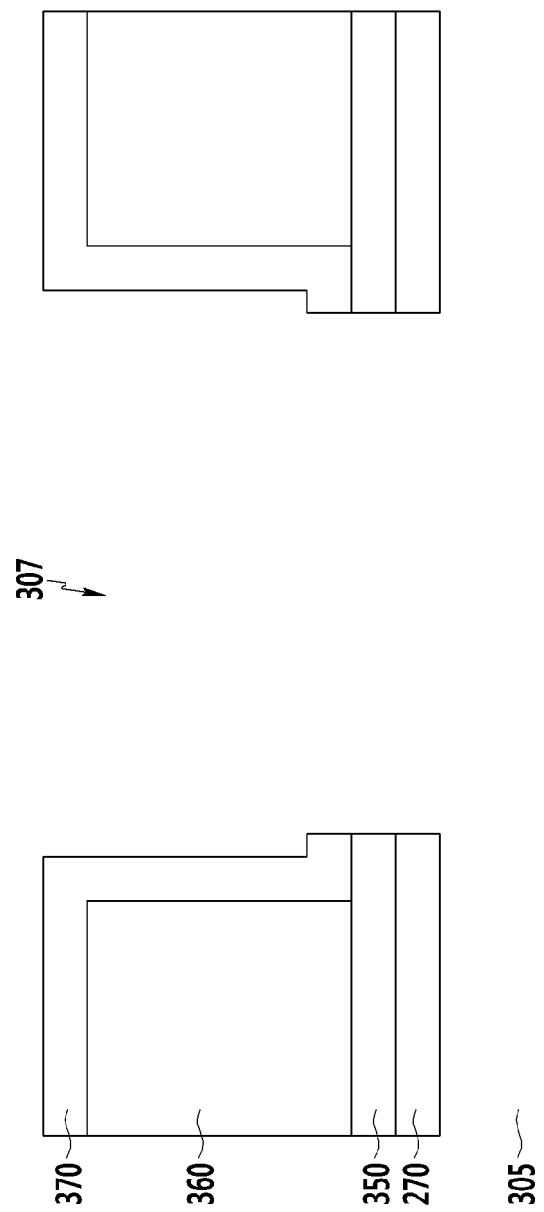

An upper insulating layer 370 is disposed on the roof layer 360. The upper insulating layer 360 is disposed on the side surface of the roof layer 360 as well as on the roof layer, thereby having a structure enclosing the roof layer 360. Referring to FIG. 20 and FIG. 36, the upper insulating layer 370 may include the inorganic insulating material such as silicon nitride (SiNx), silicon oxide (SiOx) and silicon oxynitride (SiOxNy), for example.

The common electrode 270, the lower insulating layer 350, the roof layer 360 and the upper insulating layer 370 expose the liquid crystal injection hole 307 at a side surface thereof to insert the liquid crystals 310 into the microcavity 305. The liquid crystal injection hole 307 may be used to remove a sacrificial layer, which may be provided for forming the microcavity 305.

A capping layer (not shown) is disposed on the upper insulating layer 370, thereby enclosing the liquid crystal injection hole 307. The liquid crystal injection hole 307 is covered by the capping layer such that the liquid crystal molecules 310 are effectively prevented from being leaked through the liquid crystal injection hole 307.

In an exemplary embodiment, a polarizer (now shown) may be disposed under the substrate and on the capping layer. The polarizer may include a polarized element that generates polarization and a tri-acetyl-cellulose ("TAC") layer for ensuring durability. In an exemplary embodiment, directions of transmissive axes of an upper polarizer and a lower polarizer may be substantially perpendicular or parallel to each other.

Next, an exemplary embodiment of a manufacturing method of a liquid crystal display according to the invention will be described.

FIG. 5 to FIG. 16 are views taken along a line corresponding to line E-F of FIG. 1, sequentially showing an exemplary embodiment of a manufacturing method of a liquid crystal display according to the invention.

In FIG. 5 to FIG. 16, the microcavity 305 including the pixel electrode or the structure of the underlying layers of the sacrificial layer 300 is not shown. In an exemplary embodiment, the structure of the underlying layers of the sacrificial layer 300 may be various, and thus processes before providing the sacrificial layer 300 will be hereinafter omitted.

Figure 5:
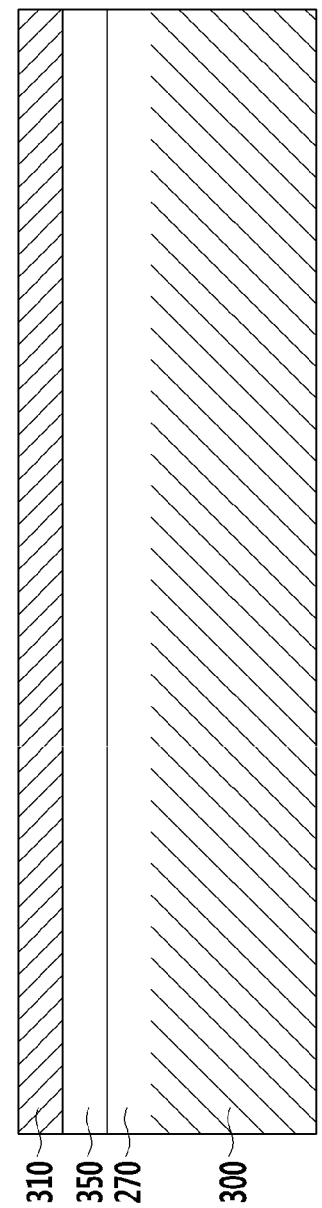
FIG. 5 to FIG. 16 are cross-sectional views taken along a line corresponding to line E-F of FIG. 1, sequentially showing an exemplary embodiment of a manufacturing method of a liquid crystal display according to an exemplary embodiment of FIG. 1 taken along the line E-F.

Referring to FIG. 5, after providing, e.g., forming, the passivation layer (not shown) and the pixel electrode (not shown), the sacrificial layer 300, the common electrode 270, the lower insulating layer 350 and the photoresist layer 310 are sequentially provided, e.g., deposited, thereon substantially in an entire surface thereof. In an exemplary embodiment, the sacrificial layer 300 and the photoresist layer 310 may include the photoresist and may have substantially the same photo-characteristic. In an exemplary embodiment, where the sacrificial layer 300 includes a positive photoresist, the photoresist layer 310 also includes the positive photoresist. In an alternative exemplary embodiment, where the sacrificial layer 300 includes a negative photoresist, the photoresist layer 310 also includes the negative photoresist. In an exemplary embodiment, the sacrificial layer 300 and the photoresist layer 310 have substantially the same photo-characteristic, but may include different materials from each other. Hereinafter, an exemplary embodiment, where the sacrificial layer 300 and the photoresist layer 310 include substantially the same photoresist material, will be described.

In an exemplary embodiment, the common electrode 270 includes the transparent conductive material such as ITO or IZO, for example, and the common electrode 270 is provided, e.g., deposited, over the sacrificial layer 300. The lower insulating layer 350 including the inorganic insulating material such as silicon nitride (SiNx), silicon oxide (SiOx) and silicon oxynitride (SiOxNy), for example, is provided thereon.

Figure 6:
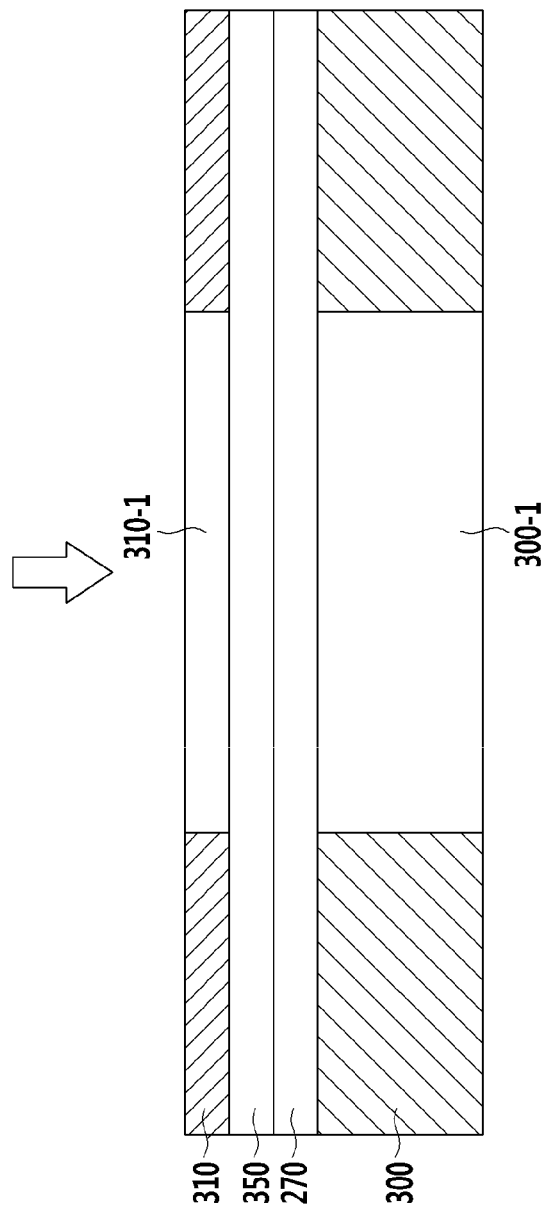

Next, as shown in FIG. 6, an exposure process is performed by exposing with light. The characteristic of the underlying sacrificial layer 300 as well as the photoresist layer 310 is changed by the exposure process. In FIG. 6, portions of the sacrificial layer 300 and the photoresist layer 310, in which the photoresist characteristic thereof are changed by the exposure process, are indicated by the reference numerals 310-1 and 300-1, and the oblique lines therein are removed. As described above, in such an embodiment, the common electrode 270 and the lower insulating layer 350 positioned on the sacrificial layer 300 include transparent materials such that the exposure process is effectively performed on the sacrificial layer 300 therebelow. In an exemplary embodiment, exposure intensity or an exposure amount may be controlled based on the decreased intensity of the light reaching the sacrificial layer 300 by the common electrode 270 and the lower insulating layer 350. The exposure region includes a region where the sacrificial layer 300 is removed to provide the liquid crystal injection hole 307. In such an embodiment, the sacrificial layer 300 in the region corresponding to the column portion of the roof layer 360 is exposed such that the characteristic thereof may be changed.

Figure 7:
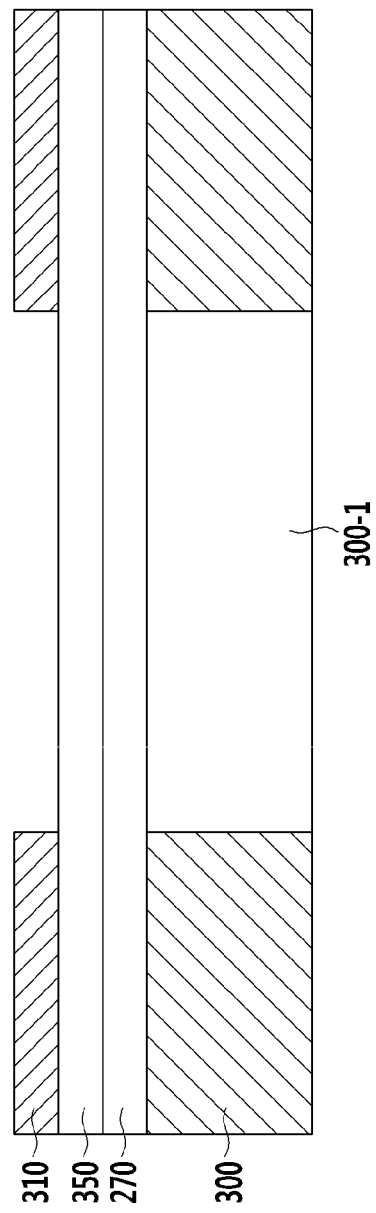

Next, as shown in FIG. 7, the portion 310-1, where the characteristic thereof is changed, is developed and removed in the photoresist layer 310.

Figure 8:
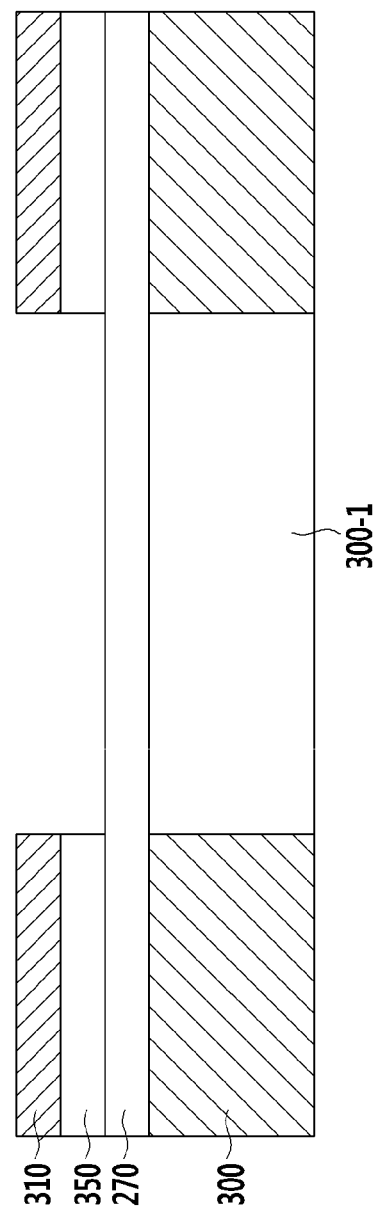

Next, as shown in FIG. 8, the underlying lower insulating layer 350 is patterned using the photoresist layer 310 as a mask. In an exemplary embodiment, an etching may be performed through dry etching or wet etching. In an exemplary embodiment, the lower insulating layer 350 is etched through the dry etching.

Figure 9:
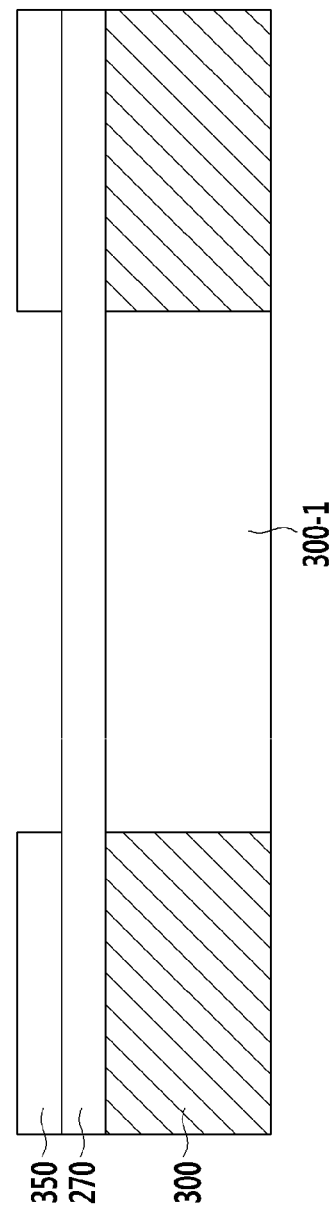

Next, as shown in FIG. 9, the photoresist layer 310 is removed through an ashing process.

Figure 10:
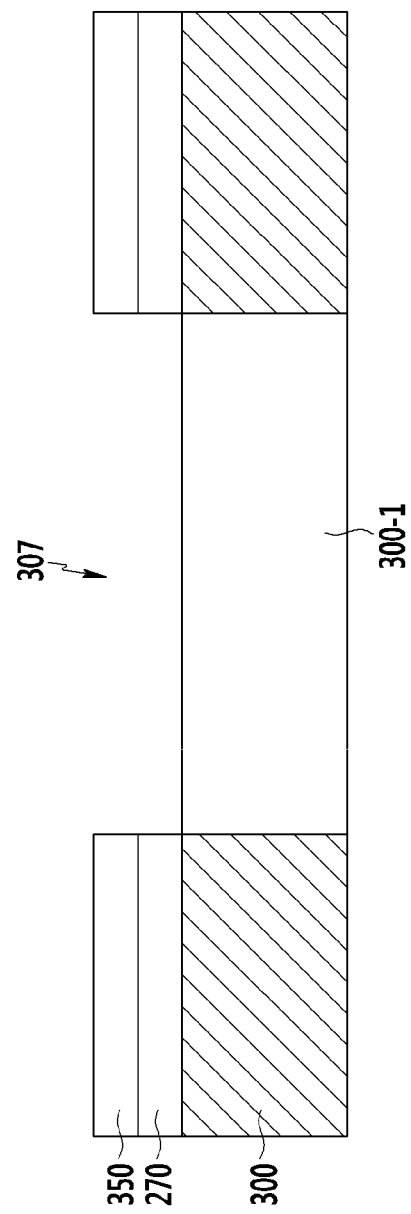

Next, as shown in FIG. 10, the common electrode 270 is etched using the patterned lower insulating layer 350 as a mask. The etching of the common electrode 270 may be performed through the dry etching or the wet etching. In one exemplary embodiment, for example, the wet etching is performed to pattern the common electrode 270. In such an embodiment, the sacrificial layer 300 is exposed by the etching of the common electrode 270, and the exposed position in the sacrificial layer 300 corresponds to the liquid crystal injection hole 307.

Figure 11:
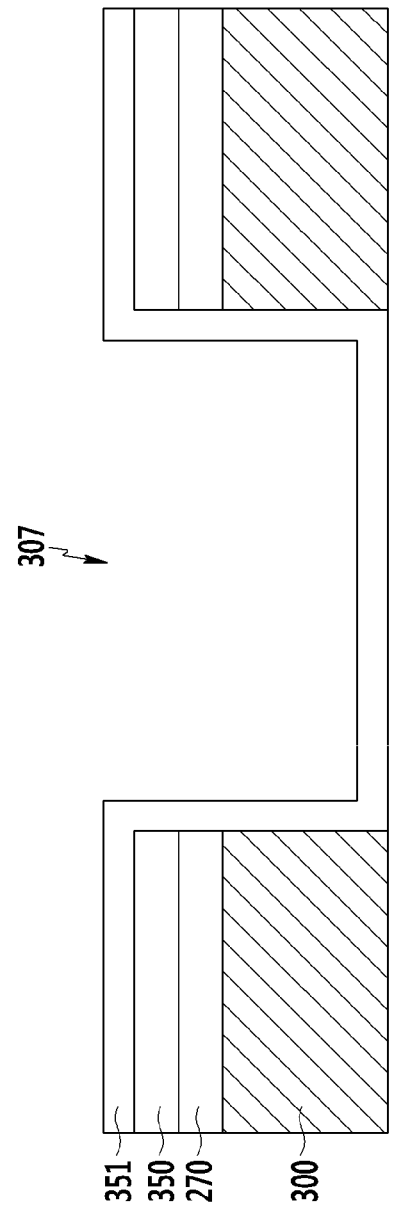

Next, as shown in FIG. 11, the portion 300-1 of the sacrificial layer 300 that is exposed through the liquid crystal injection hole 307 is developed and removed. In an exemplary embodiment, the characteristic of the portion 300-1 that is previously exposed in the exposure process described referring to FIG. 6 is changed such that the portion 300-1 may be removed through simple developing. In such an embodiment, the sacrificial layer 300 positioned under the common electrode 270 does not contact a developer used for developing such that the layer characteristic of the sacrificial layer 300 is not changed. Accordingly, in such an embodiment, the sacrificial layer 300 may be substantially entirely and efficiently and effectively removed during a process of removing the sacrificial layer 300 thereafter. Next, in FIG. 11, an additional lower insulating layer 351 is provided, e.g., deposited, on the entire surface of the substrate. The additional lower insulating layer 351 may include a material including the inorganic insulating material such as silicon nitride (SiNx), silicon oxide (SiOx) and silicon oxynitride (SiOxNy), for example. According to an alternative exemplary embodiment, the additional lower insulating layer 351 may be omitted. The additional lower insulating layer 351 may protect the sacrificial layer 300 such that the sacrificial layer 300 is effectively prevented from being removed when developing and patterning the roof layer 360.

Figure 12:
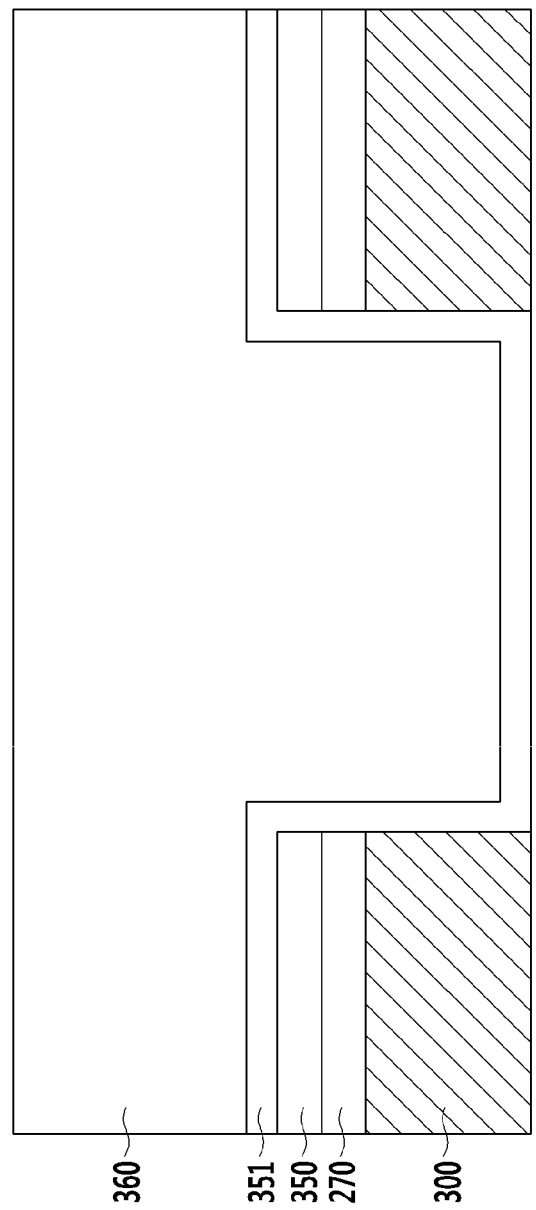

Next, as shown in FIG. 12, the roof layer 360 is provided on substantially the entire surface of the substrate. The roof layer 360 may include an organic material or a photoresist material like the sacrificial layer 300. In an exemplary embodiment, the roof layer 360 may have substantially the same characteristic as the sacrificial layer 300, but not being limited thereto. In an alternative exemplary embodiment, the characteristics of the roof layer 360 and the sacrificial layer 300 may be different from each other.

In an exemplary embodiment, the common electrode 270 and the lower insulating layer 350 may be removed and then deposited again on the sacrificial layer 300 before providing the roof layer 360 such that a possibility of the characteristic change of the sacrificial layer 300, the common electrode 270 and the lower insulating layer 350 is substantially reduced or minimized.

Figure 13:
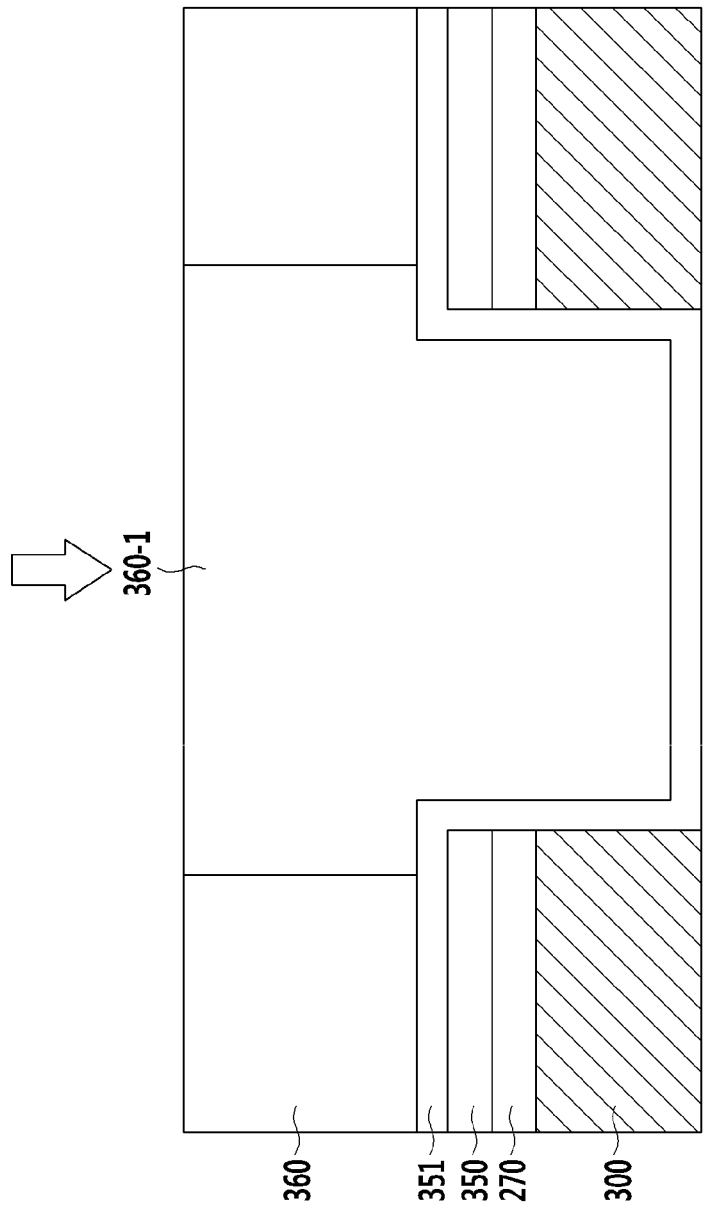

Next, as shown in FIG. 13, a portion of the roof layer 360 is exposed. The layer characteristic of the exposed portion 360-1 of the roof layer 360 is changed.

Figure 14:
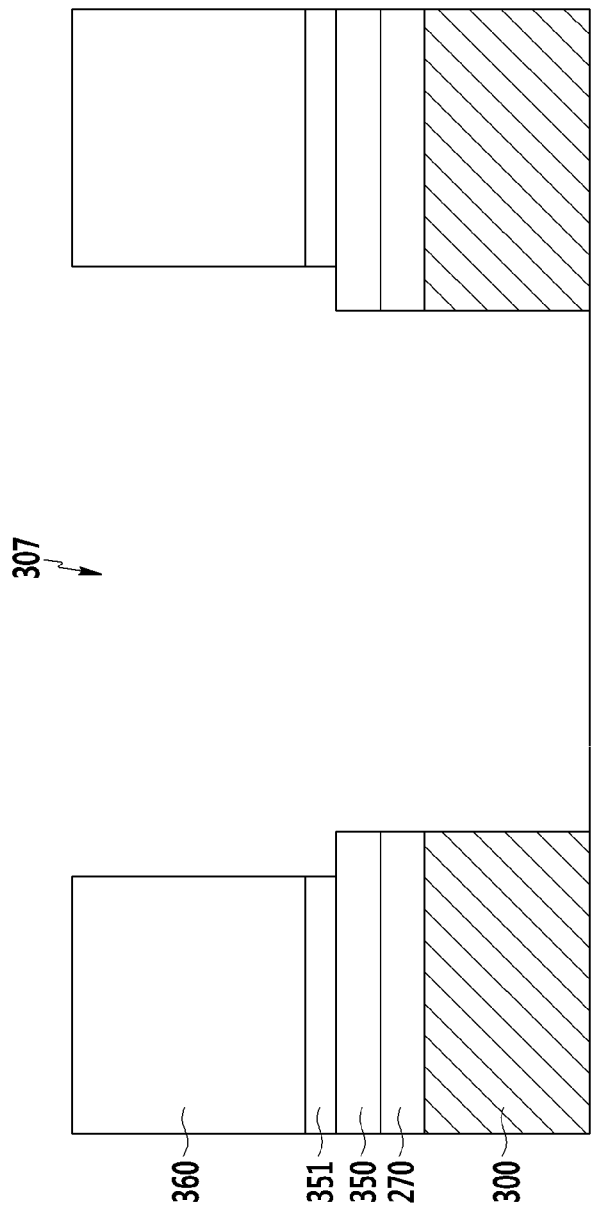

Next, as shown in FIG. 14, by developing the roof layer 360, the exposed portion 360-1 thereof is removed such that the roof layer 360 is patterned. Next, the additional lower insulating layer 351 is etched using the patterned roof layer 360 as a mask. The additional lower insulating layer 351 may be etched through the wet etching or the dry etching. In an exemplary embodiment, the additional lower insulating layer 351 is etched by the dry etching, such that the side surface of the sacrificial layer 300 is exposed and the liquid crystal injection hole 307 is thereby formed.

A length of the roof layer 360 in the vertical direction (e.g., a height of the roof layer 360) may be equal to or smaller than a length of the sacrificial layer 300 in the vertical direction (e.g., a height of the sacrificial layer 300).

Figure 15:
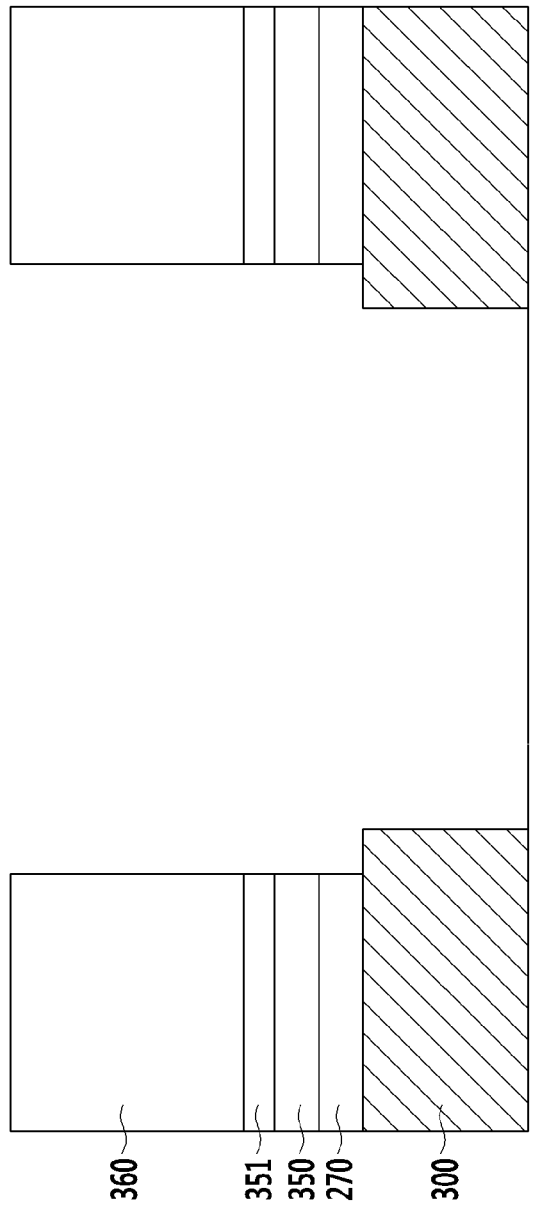

Next, as shown in FIG. 15, the lower insulating layer 350 and the common electrode 270 thereunder are etched using the etched additional lower insulating layer 351 as a mask. In such an embodiment, the dry etching may be performed for the different layers having different characteristics, such that the upper portion of the sacrificial layer 300 is partially exposed, and the liquid crystal injection hole 307 becomes further widened.

Figure 16:

Next, as shown in FIG. 16, a stripper is provided through the liquid crystal injection hole 307 to remove the sacrificial layer 300 including the photoresist such that the microcavity 305 is provided. In general, when removing the sacrificial layer 300 by the wet etching, the layer characteristic of the sacrificial layer 300 may be changed by the developer, and a portion of the sacrificial layer 300 may remain inside the microcavity 305 such that the cell gap in the microcavity 305 may not be substantially uniformly maintained. Accordingly, a deterioration of display quality of the liquid crystal display may occur. In an exemplary embodiment of the invention, the sacrificial layer 300 under the common electrode 270 does not contact the developer such that the layer characteristic is not changed. Accordingly, in such an embodiment, the etchant such as the stripper is efficiently and effectively removed such that the sacrificial layer 300 does not remain in the microcavity 305.

In an exemplary embodiment, a process of providing the alignment layer and the liquid crystal layer in the microcavity 305 is performed using the capillary force.

Next, a process of sealing the microcavity 305 may be performed by providing a capping layer that effectively prevents the liquid crystal layer in the microcavity 305 from being leaked.

In such an embodiment, a process of attaching a polarizer to the underside of the substrate and on the capping layer may be further included.

In an exemplary embodiment of a method of manufacturing the liquid crystal display, where the liquid crystal layer is provided in the microcavity 305, the common electrode 270 is positioned only on the upper surface of the microcavity 305 and the pixel electrode is maintained at a predetermined distance from the common electrode 270 such that a short between the pixel electrode and the common electrode 270 and the display deterioration due to the parasitic capacitance between the pixel electrode and the common electrode 270 may be effectively prevented.

Next, an exemplary embodiment of a manufacturing method of a liquid crystal display will be sequentially described with reference to FIG. 17 and FIG. 18.

Figure 17:
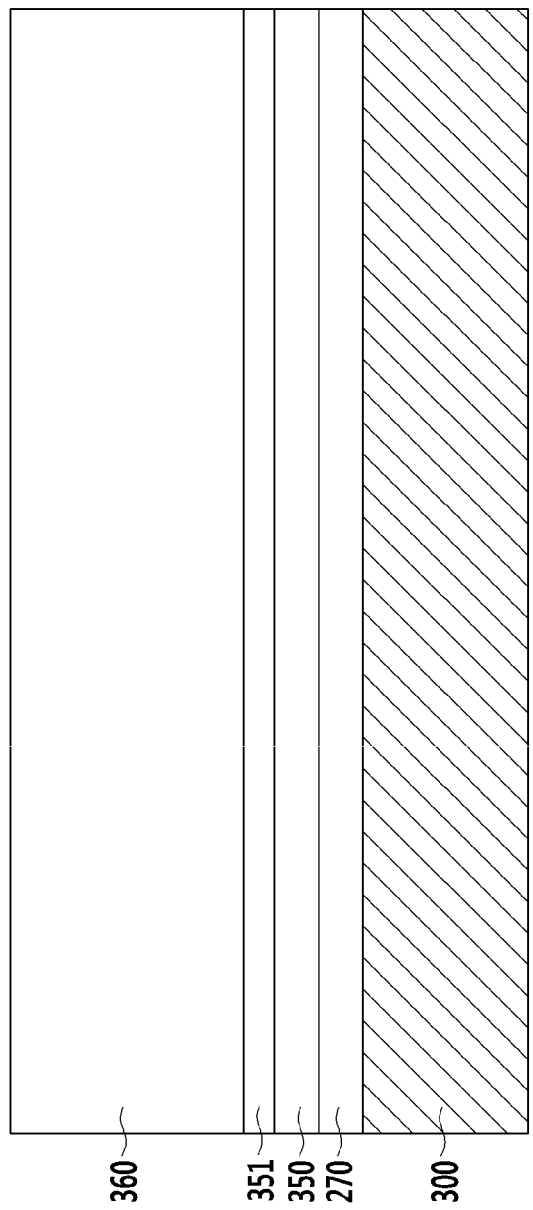
FIG. 17 and FIG. 18 are cross-sectional views taken along al line corresponding to line C-D of FIG. 1, sequentially showing an exemplary embodiment of a manufacturing method of a liquid crystal display according to the invention.
Figure 18:
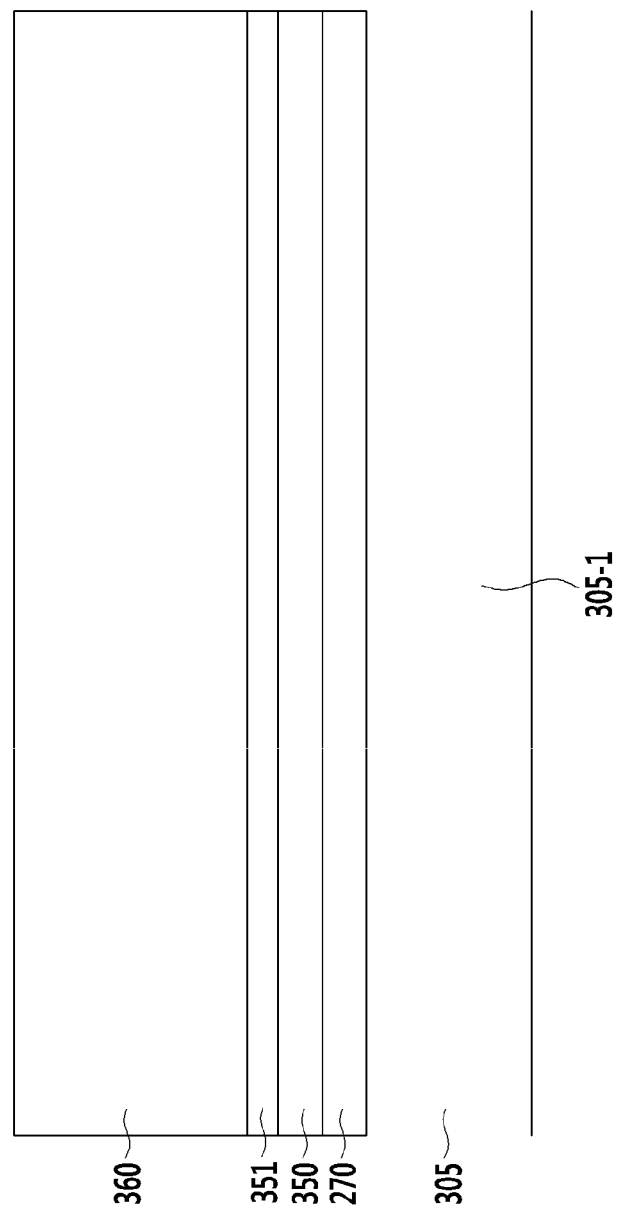

FIG. 17 and FIG. 18 are cross-sectional views taken along a line corresponding to line C-D, sequentially showing an exemplary embodiment of a manufacturing method of a liquid crystal display according to the invention.

FIG. 17 is a cross-sectional view corresponding to FIG. 12. A portion of the sacrificial layer 300 corresponding to line C-D of FIG. 1 remains when the sacrificial layer 300 is exposed and developed such that the layered structure is shown in FIG. 17 is provided.

Next, the roof layer 360 is exposed and developed to form a liquid crystal injection hole 307.

Next, as shown in FIG. 18, the sacrificial layer 300 exposed through the liquid crystal injection hole 307 is removed by wet etching to form the microcavity 305. In FIG. 18, a portion including a connection 305-1 that connects the adjacent microcavities 305 is shown.

Next, an alternative exemplary of a manufacturing method of a liquid crystal display will be described with reference to FIG. 19 to FIG. 21.

Figure 19:
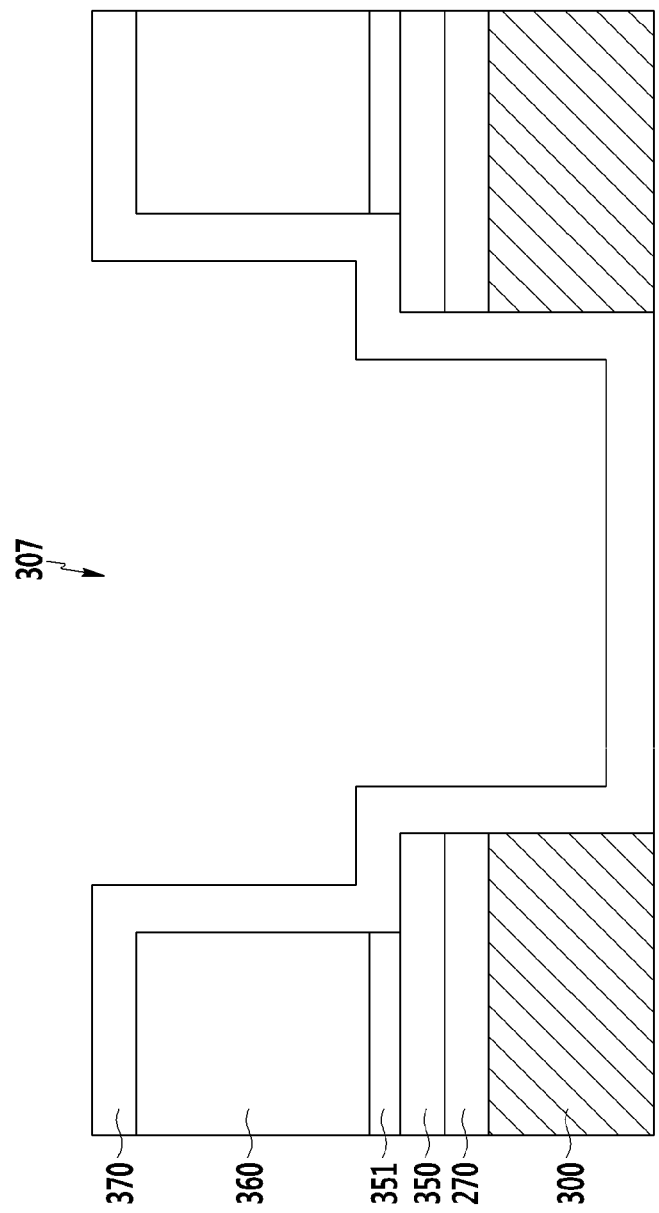
FIG. 19 to FIG. 21 are cross-sectional views sequentially showing an alternative exemplary embodiment of a manufacturing method of a liquid crystal display according to the invention.
Figure 21:
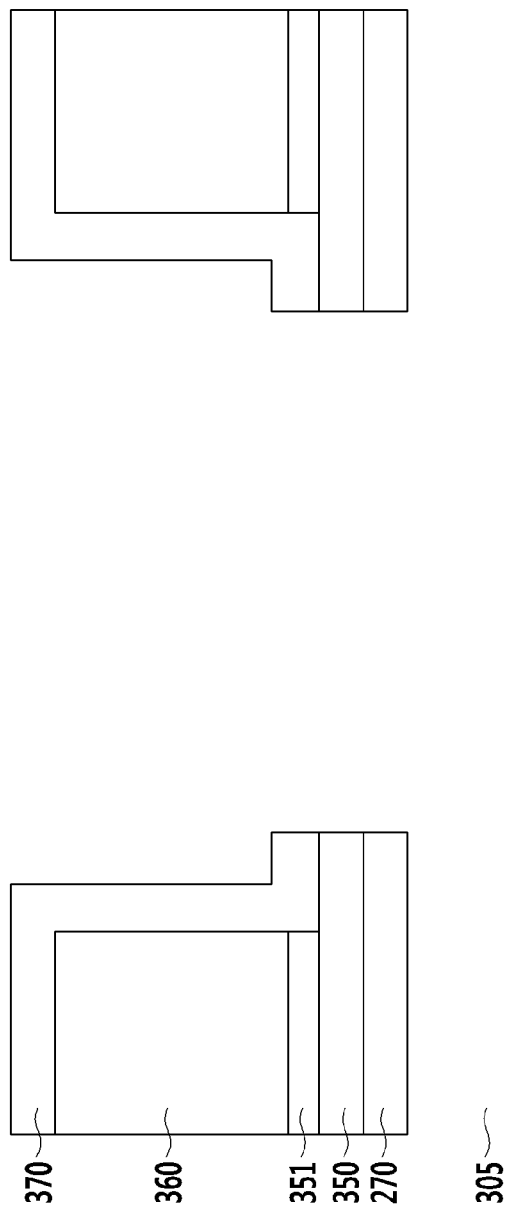

FIG. 19 to FIG. 21 are cross-sectional views sequentially showing an alternative exemplary embodiment of a manufacturing method of a liquid crystal display according to the invention.

FIG. 19 shows a process that may be performed after the process described with reference to FIG. 14. In an exemplary embodiment, as shown in FIG. 19, an upper insulating layer 370 covering the entire surface of the roof layer 360 and the substrate is provided. The upper insulating layer 370 may include the inorganic insulating material such as silicon nitride (SiNx), silicon oxide (SiOx) and silicon oxynitride (SiOxNy), for example.

Next, as shown in FIG. 20, the material of the upper insulating layer 370 covering the liquid crystal injection hole 307 is etched to expose a portion of the sacrificial layer 300. In an exemplary embodiment, a photoresist pattern that exposes the liquid crystal injection hole 307 on the upper insulating layer 370 may be provided, and the dry etching may be performed using the photoresist pattern as a mask.

Next, as shown in FIG. 21, the exposed sacrificial layer 300 is wet etched and removed.

In the exemplary embodiment of the manufacturing method shown in FIG. 19 to FIG. 21, the roof layer 360 is protected by the upper insulating layer 370 such that the roof layer 360 is protected when wet-etching the sacrificial layer 300. In such an embodiment, the roof layer 360 and the sacrificial layer 300 may include substantially the same material as each other.

Next, another alternative exemplary embodiment of a manufacturing method of a liquid crystal display according to the invention will be described with reference to FIG. 22 to FIG. 33.

FIG. 22 to FIG. 33 are cross-sectional views sequentially showing an alternative exemplary embodiment of a manufacturing method of a liquid crystal display according to the invention.

FIG. 22 to FIG. 33 are the cross-sectional views taken along a line corresponding to line E-F of the liquid crystal display of FIG. 1 as FIG. 5 to FIG. 16, and the microcavity 305 including the pixel electrode or the structure of the underlying layers of the sacrificial layer 300 are not shown. The structure of the underlying layers may be variously modified, and thus, processes after a process of providing the sacrificial layer 300 will now be described in detail.

Figure 22:
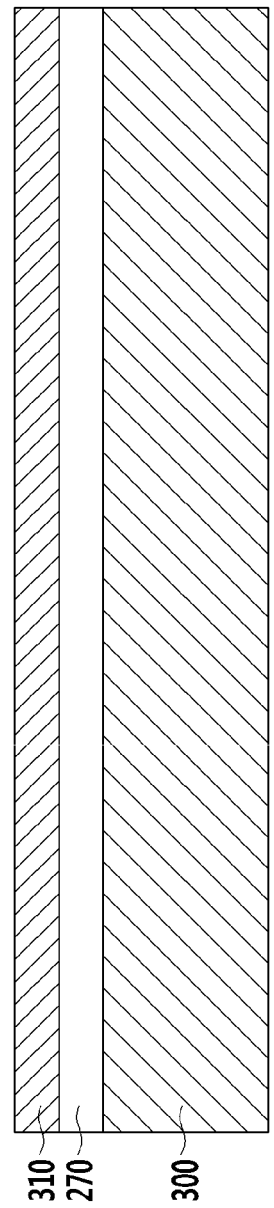
FIG. 22 to FIG. 33 are cross-sectional views sequentially showing an alternative exemplary embodiment of a manufacturing method of a liquid crystal display according to the invention.

Firstly, referring to FIG. 22, the sacrificial layer 300, the common electrode 270 and the photoresist layer 310 are continuously deposited on the entire surface of a passivation layer (not shown) and a pixel electrode (not shown) after providing the passivation layer and the pixel electrode. In such an embodiment, the sacrificial layer 300 and the photoresist layer 310 may include the photoresist and also have substantially the same photocharacteristic. In an exemplary embodiment, where the sacrificial layer 300 includes a positive photoresist, the photoresist layer 310 includes the positive photoresist. In an alternative exemplary embodiment, where the sacrificial layer 300 includes a negative photoresist, the photoresist layer 310 includes the negative photoresist. In such an embodiment, where the sacrificial layer 300 and the photoresist layer 310 have substantially the same photocharacteristic, the sacrificial layer 300 and the photoresist layer 310 may include different materials from each other.

In an exemplary embodiment, the common electrode 270 includes the transparent conductive material such as ITO or IZO, for example, and the common electrode 270 is provided under the sacrificial layer 300 and the photoresist layer 310.

Figure 23:
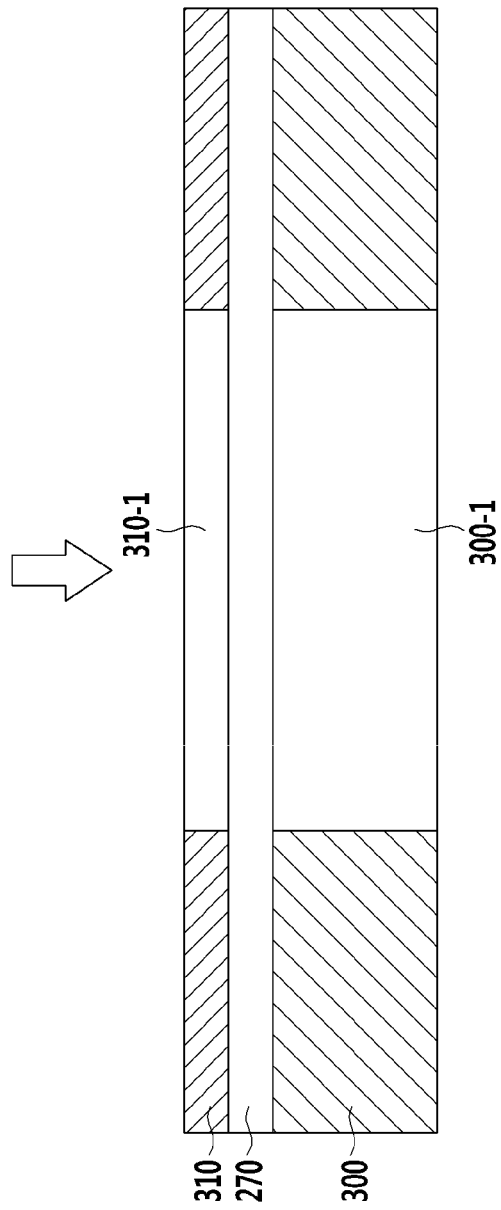

Next, as shown in FIG. 23, an exposure process is performed with light. In an exemplary embodiment, the photoresist layer 310 and the underlying sacrificial layer 300 are exposed by the exposure process such that the characteristic thereof is changed. In FIG. 23, portions of the sacrificial layer 300 and the photoresist layer 310, in which the photoresist characteristic thereof are changed by the exposure process, are indicated by the reference numerals 310-1 and 300-1, and the oblique lines therein are removed. As described above, in such an embodiment, the common electrode 270 and the lower insulating layer 350 positioned on the sacrificial layer 300 include transparent materials such that the exposure process is effectively performed on the sacrificial layer 300 therebelow. In an exemplary embodiment, exposure intensity or an exposure amount may be controlled based on the decreased intensity of the light reaching the sacrificial layer 300 by the common electrode 270 and the lower insulating layer 350. The exposure region includes a region where the sacrificial layer 300 is removed to provide the liquid crystal injection hole 307. In such an embodiment, the sacrificial layer 300 in the region corresponding to the column portion of the roof layer 360 is exposed such that the characteristic thereof may be changed.

Figure 24:
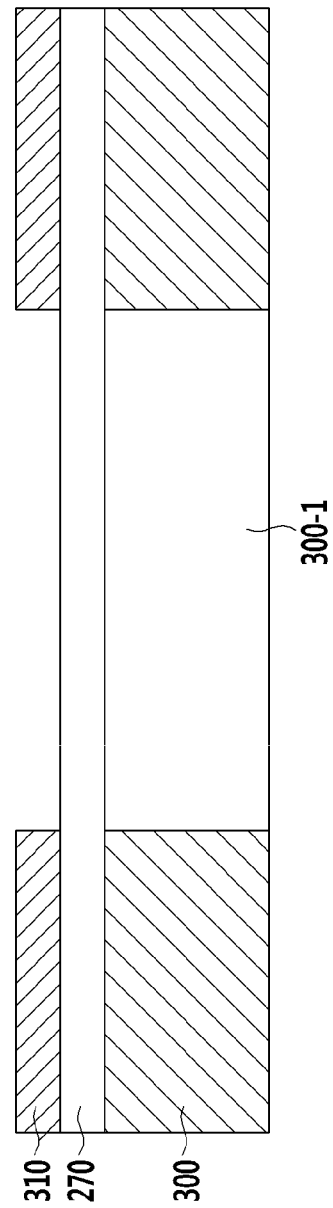

Next, as shown in FIG. 24, the portion 310-1 where the characteristic thereof is changed is developed and removed in the photoresist layer 310.

Figure 25:
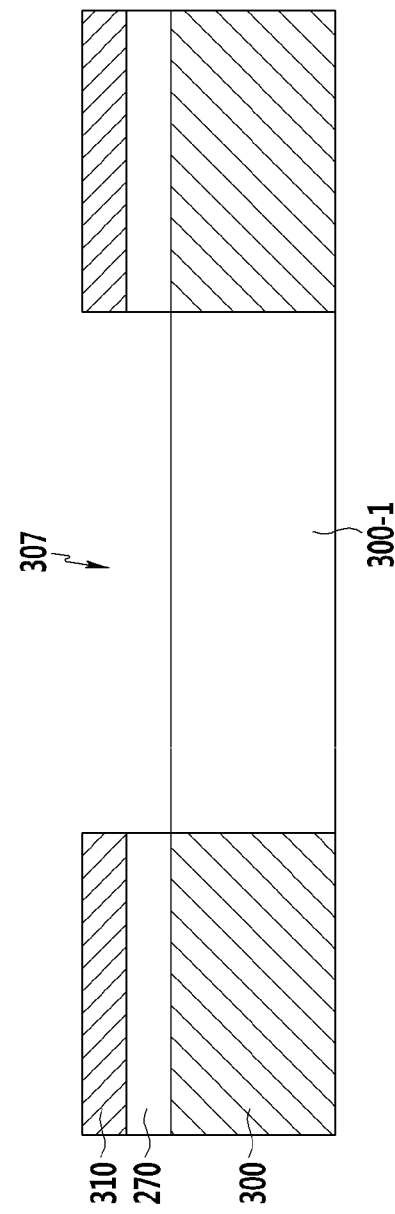

Next, as shown in FIG. 25, the common electrode 270 is etched using the pattern of the photoresist layer 310 as a mask to form the liquid crystal injection hole 307 exposing the sacrificial layer 300. The etching may be performed through dry etching or wet etching. In one exemplary embodiment, for example, the common electrode 270 is etched through the wet etching.

Figure 26:
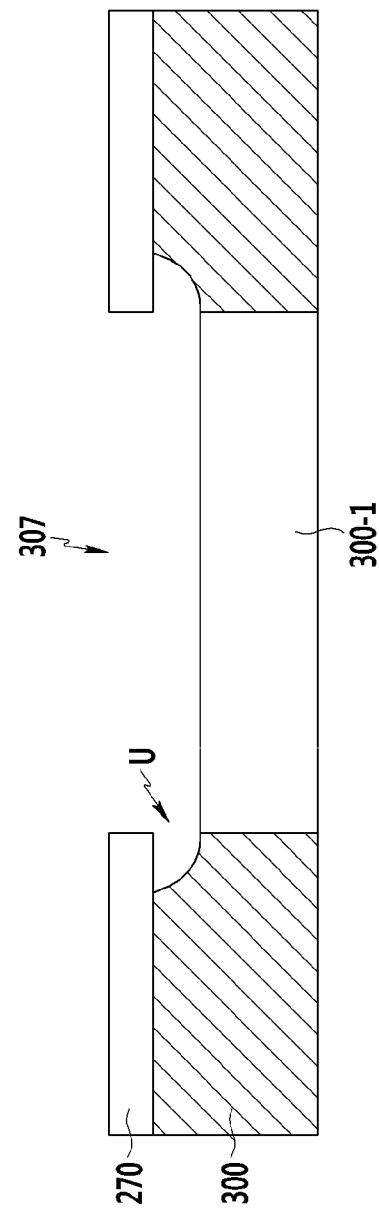

Next, as shown in FIG. 26, the photoresist layer 310 is removed through an ashing process. In such an embodiment, the portion 300-1 exposed through the liquid crystal injection hole 307 is partially removed. Also, the portion of the sacrificial layer 300 covered by the common electrode 270 is partially removed such that an undercut structure U is formed under the common electrode 270.

Figure 27:

Next, as shown in FIG. 27, the portion 300-1 of the sacrificial layer 300 exposed through the liquid crystal injection hole 307 is removed. The characteristic of the portion 300-1 that is exposed in the exposure process shown in FIG. 23 is already changed such that the portion 300-1 may be removed through the simple developing. In such an embodiment, the sacrificial layer 300 positioned under the common electrode 270 does not contact a developer which may be used when developing the portion 300-1 of the sacrificial layer 300 such that the characteristic of the sacrificial layer 300 is not changed, and the sacrificial layer 300 is thereby substantially entirely and effectively removed during a process for removing the sacrificial layer 300 thereafter.

Figure 28:
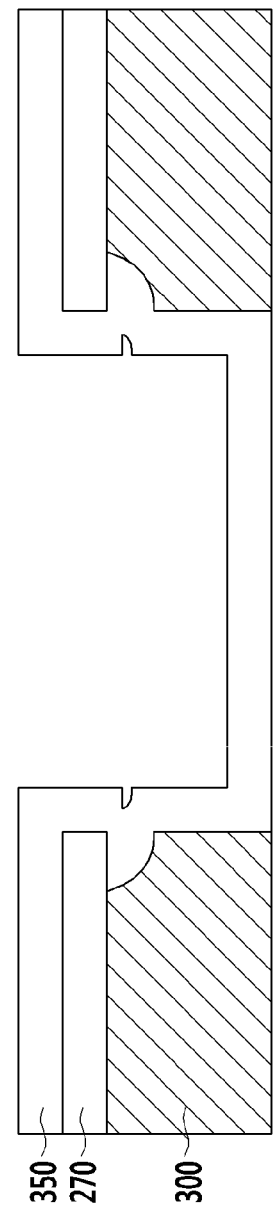

Next, as shown in FIG. 28, the lower insulating layer 350 is provided, e.g., deposited, on the entire surface of the substrate. The lower insulating layer 350 includes the material including the inorganic insulating material such as silicon nitride (SiNx), silicon oxide (SiOx) and silicon oxynitride (SiOxNy), for example. The lower insulating layer 350 may protect the sacrificial layer 300 such that the sacrificial layer 300 is effectively prevented from being removed when developing and patterning the roof layer 360.

Figure 29:
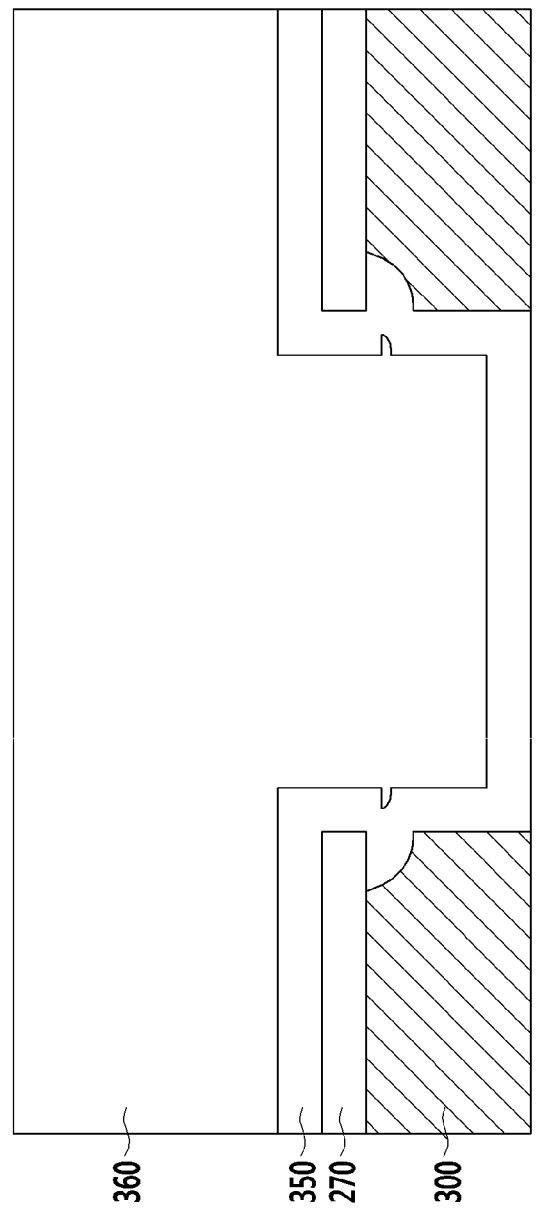

Next, as shown in FIG. 29, the roof layer 360 is provided, e.g., deposited, on the entire surface of the substrate. The roof layer 360 may include the organic material or the photoresist material as the sacrificial layer 300. The roof layer 360 may have substantially the same characteristic as the sacrificial layer 300, but not being limited thereto. In an alternative exemplary embodiment, the characteristics of the roof layer 360 and the sacrificial layer 300 may be different from each other.

Figure 30:
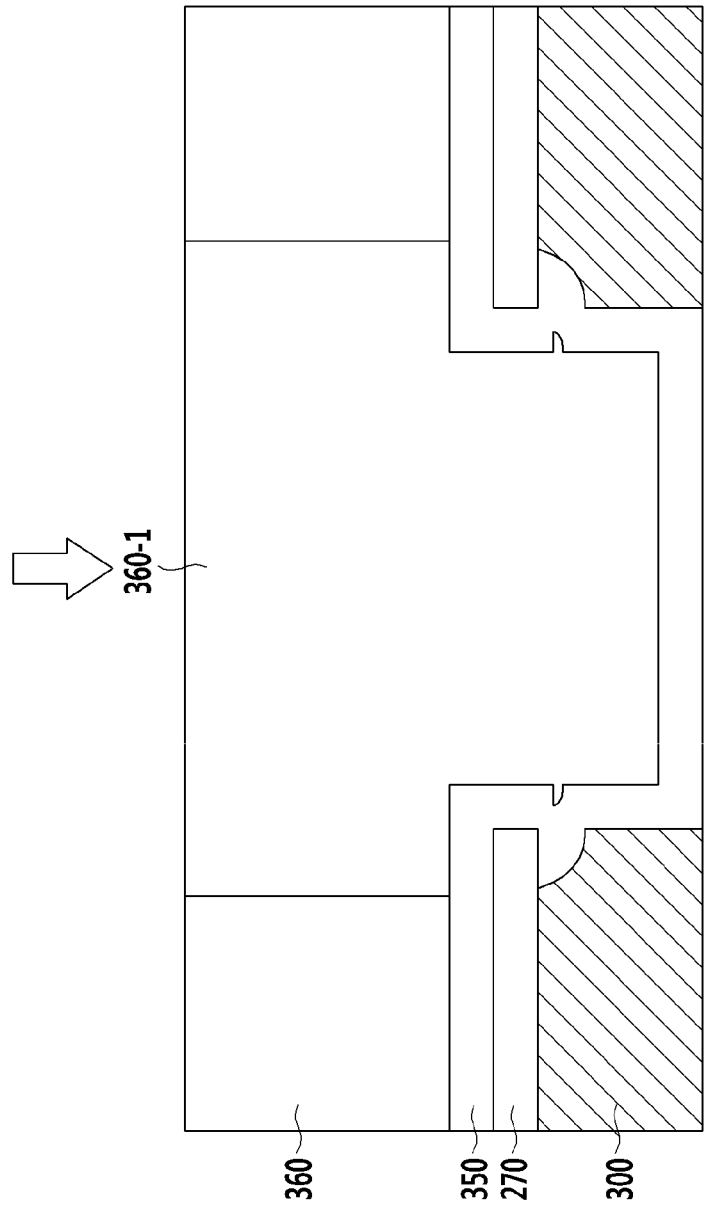

Next, as shown in FIG. 30, a portion of the roof layer 360 is exposed such that the characteristic of the exposed portion 360-1 of the roof layer 360 is changed.

Figure 31:
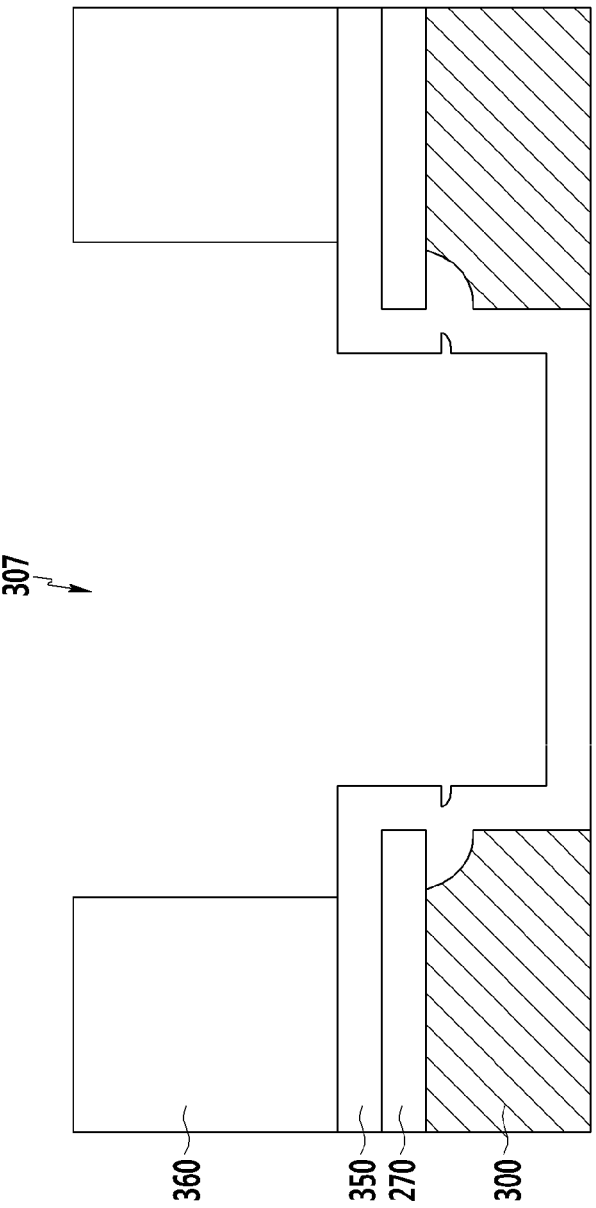

Next, as shown in FIG. 31, the exposed portion 360-1 is removed by developing the roof layer 360 such that the roof layer 360 is patterned. The length of the roof layer 360 in a vertical direction (e.g., height of the roof layer 360) may be equal to or less than a length of the sacrificial layer 300 in the vertical direction (e.g., height of the sacrificial layer 300).

Figure 32:
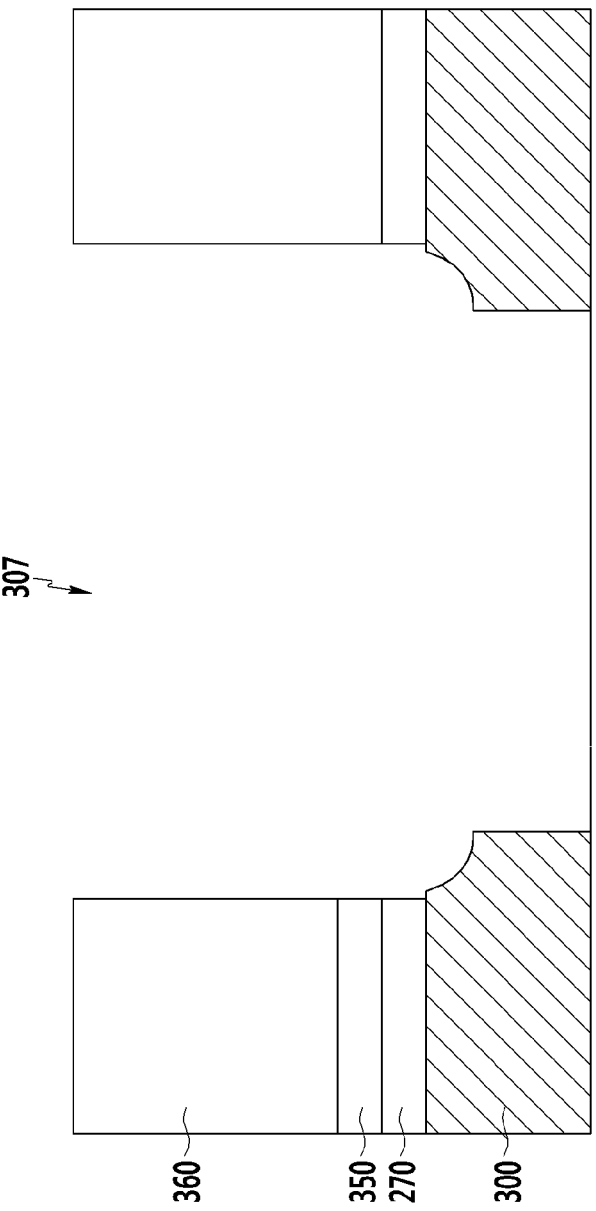

Next, as shown in FIG. 32, the lower insulating layer 350 and the common electrode 270 are etched using the patterned roof layer 360 as a mask such that the liquid crystal injection hole 307 exposing the sacrificial layer 300 is provided. In an exemplary embodiment, the lower insulating layer 350 and the common electrode 270 may be etched by the dry etching.

Figure 33:
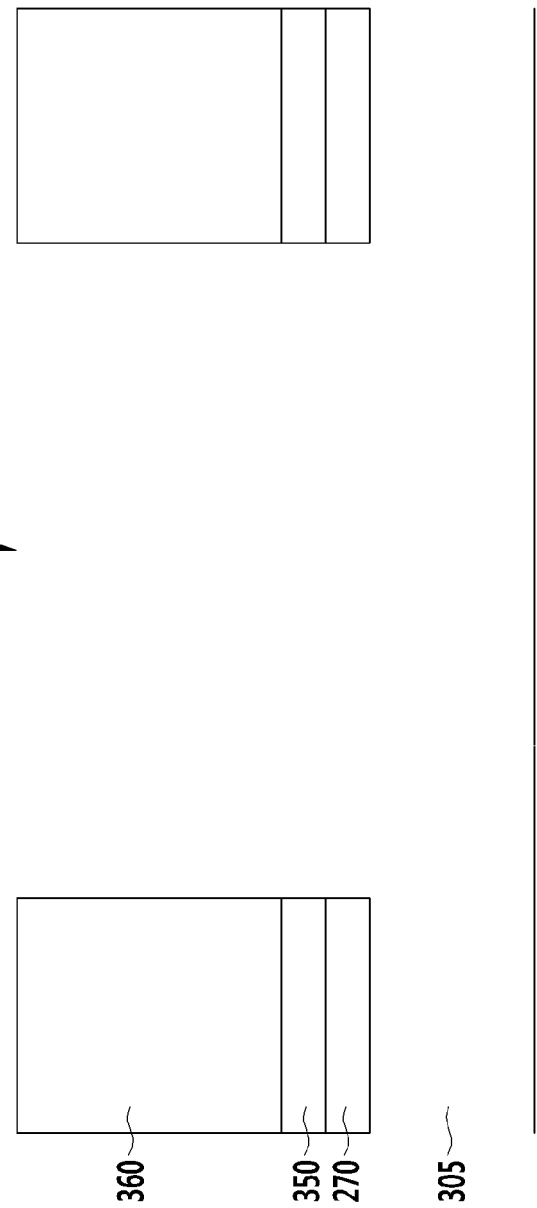

Next, as shown in FIG. 33, a stripper is provided through the liquid crystal injection hole 307 to remove the sacrificial layer 300 including the photoresist such that the microcavity 305 is provided. In general, when removing the sacrificial layer 300 by the wet etching, the layer characteristic of the sacrificial layer 300 may be changed by the developer, and the material of the partial sacrificial layer 300 may remain inside the microcavity 305, such that the cell gap in the microcavity 305 may not be substantially uniformly maintained. Accordingly, a deterioration of display quality of the liquid crystal display may occur. In an exemplary embodiment of the invention, the sacrificial layer 300 under the common electrode 270 does not contact the developer such that the layer characteristic is not changed. Accordingly, in an exemplary embodiment, the etchant such as the stripper is efficiently and effectively removed such that the sacrificial layer 300 does not remain in the microcavity 305.

In an exemplary embodiment, a process of providing the alignment layer and the liquid crystal layer in the microcavity 305 is performed using capillary force.

Next, a process of sealing the microcavity 305 may be performed by providing a capping layer that effectively prevents the liquid crystal layer in the microcavity 305 from being leaked.

In such an embodiment, the process of attaching the polarizer to the underside of the substrate and on the capping layer may be further included.

In an exemplary embodiment of a method of manufacturing a liquid crystal display, where the liquid crystal layer is provided in the microcavity 305, the common electrode 270 is positioned only on the upper surface of the microcavity 305, and the pixel electrode is maintained at a predetermined distance from the common electrode 270 such that a short between the pixel electrode and the common electrode 270 and the display deterioration due to the parasitic capacitance between the pixel electrode and the common electrode 270 may be effectively prevented.

Next, an alternative exemplary embodiment of a manufacturing method of a liquid crystal display will be described with reference to FIG. 34 to FIG. 36.

Figure 34:
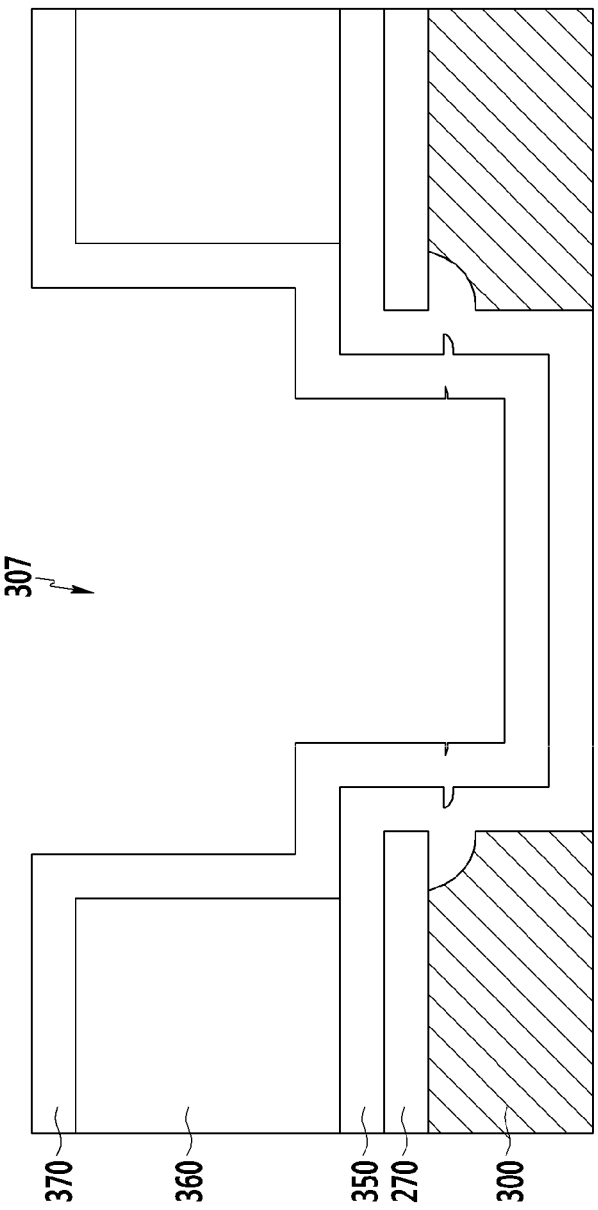
FIG. 34 to FIG. 36 are cross-sectional views sequentially showing an alternative exemplary embodiment of a manufacturing method of a liquid crystal display according to the invention.
Figure 35:
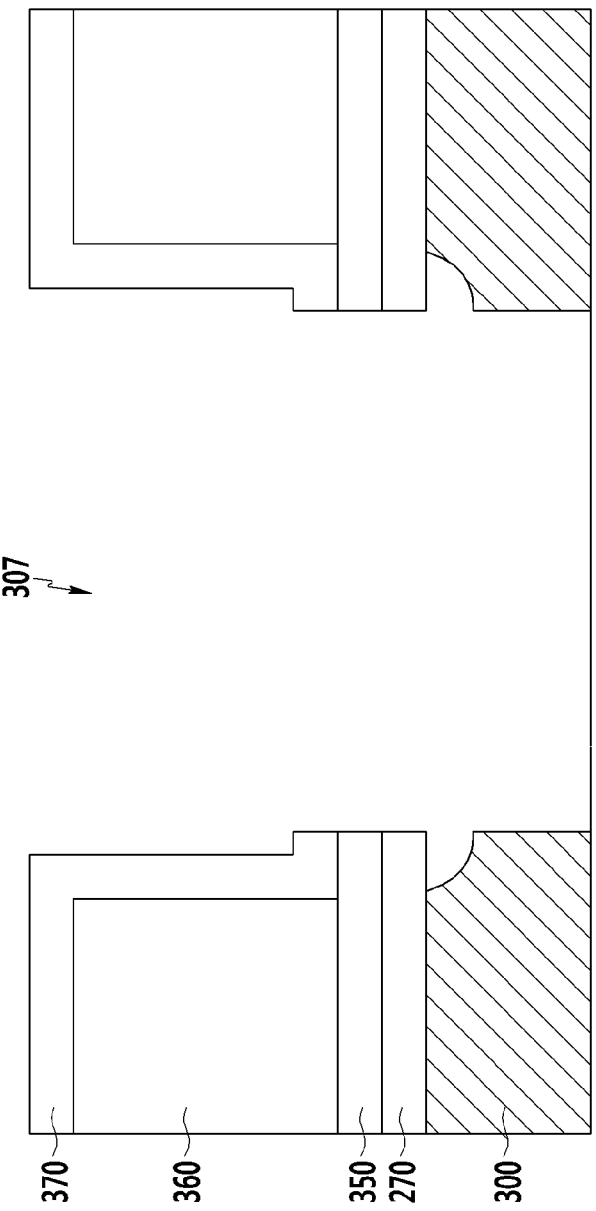

FIG. 34 to FIG. 36 are cross-sectional views sequentially showing an alternative exemplary embodiment of a manufacturing method of a liquid crystal display according to the invention.

FIG. 34 shows a process that may be performed after the process described with reference to FIG. 31. In an exemplary embodiment, as shown in FIG. 34, an upper insulating layer 370 is provided to cover the entire surface of the roof layer 360 and the substrate. The upper insulating layer 370 may include the inorganic insulating material such as silicon nitride (SiNx), silicon oxide (SiOx) and silicon oxynitride (SiOxNy), for example.

Next, as shown in FIG. 35, the upper insulating layer 370 covering the liquid crystal injection hole 307 is etched to expose a portion of the sacrificial layer 300. In an exemplary embodiment, a photoresist pattern exposing the liquid crystal injection hole 307 on the upper insulating layer 370 may be provided, and the dry etching may be performed using the photoresist pattern as a mask.

Next, as shown in FIG. 36, the exposed sacrificial layer 300 is wet etched and removed.

In the exemplary embodiment of the manufacturing method shown in FIG. 34 to FIG. 36, the roof layer 360 is protected by the upper insulating layer 370 such that the roof layer 360 is protected when wet-etching the sacrificial layer 300. In such an embodiment, the roof layer 360 and the sacrificial layer 300 may include substantially the same material.

In the exemplary embodiments described above, a structure under the microcavity 305 may have various structures. The structure under the microcavity 305 may include the thin film transistor, the wiring, the pixel electrode, the color filter and the light blocking member. Hereinafter, an exemplary embodiment of the liquid crystal display will be described with reference to FIG. 37.

Figure 37:
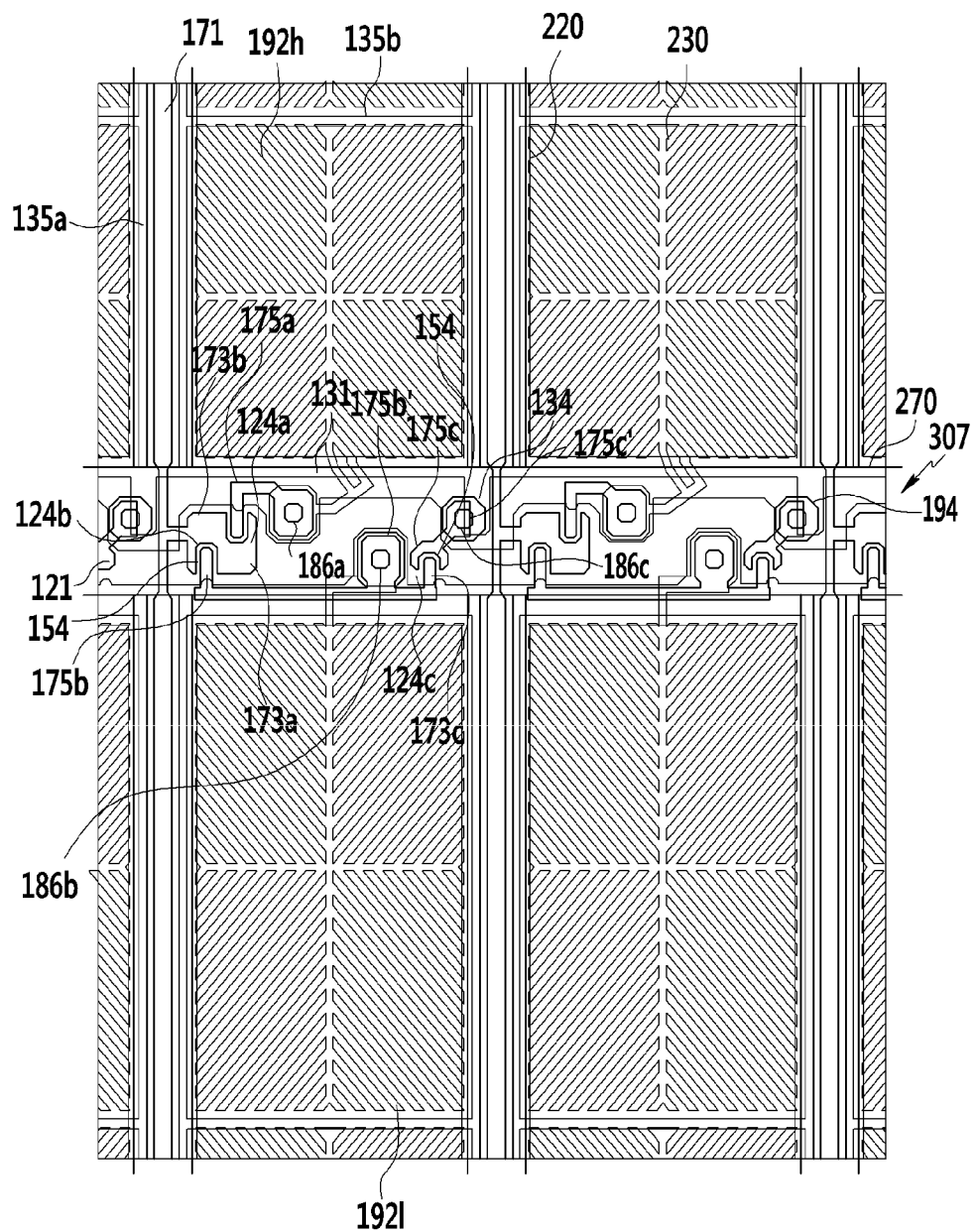
FIG. 37 is a top plan view of a pixel of a liquid crystal display according to an exemplary embodiment of the invention.

FIG. 37 is a top plan view of a pixel of an exemplary embodiment of a liquid crystal display according to the invention.

FIG. 37 shows an exemplary embodiment where a pixel including subpixels that are defined by adjacent microcavities 305 positioned upwardly and downwardly with respect to the liquid crystal injection hole 307, respectively.

In an exemplary embodiment, a gate line 121 and a storage voltage line 131 are disposed on an insulation substrate including a transparent glass or plastic. The gate line 121 includes a first gate electrode 124a, a second gate electrode 124b and a third gate electrode 124c of a pixel. The storage voltage line 131 includes storage electrodes 135a and 135b, and a protrusion 134 protruding in a direction toward the gate line 121. The storage electrodes 135a and 135b of the pixel have a structure surrounding a first subpixel electrode 192h of the pixel and a second subpixel electrode 192l of an upper pixel. In such an embodiment, as shown in FIG. 37, a horizontal portion 135b of the storage electrode may be a wire connected to a horizontal portion 135b of an adjacent pixel (e.g., a left side pixel or a right side pixel).

A gate insulating layer (not shown) is disposed on the gate line 121 and the storage voltage line 131. A semiconductor (not shown) positioned below a data line 171, a semiconductor (not shown) positioned below source/drain electrodes, and a semiconductor 154 positioned at a channel portion of a thin film transistor are disposed on the gate insulating layer.

A plurality of ohmic contacts (not shown) may be disposed on each of the semiconductors 154 and between the data line 171 and source/drain electrodes.

In such an embodiment, data conductors 171, 173a, 173b, 173c, 175a, 175b and 175c, which include the data line 171 including a first source electrode 173a and a second source electrode 173b, a first drain electrode 175a, a second drain electrode 175b, a third source electrode 173c, and a third drain electrode 175c, are disposed on the semiconductors 154 and the gate insulating layer.

In such an embodiment, the first gate electrode 124a, the first source electrode 173a and the first drain electrode 175a collectively define a first thin film transistor together with the semiconductor 154, and a channel of the thin film transistor is formed at the semiconductor portion 154 between the first source electrode 173a and the first drain electrode 175a. Similarly, the second gate electrode 124b, the second source electrode 173b and the second drain electrode 175b collectively define a second thin film transistor together with the semiconductor 154, and a channel of the thin film transistor is formed at the semiconductor portion 154 between the second source electrode 173b and the second drain electrode 175b. The third gate electrode 124c, the third source electrode 173c and the third drain electrode 175c collectively define a third thin film transistor together with the semiconductor 154, and a channel of the thin film transistor is formed at the semiconductor portion 154 between the third source electrode 173c and the third drain electrode 175c.

In an exemplary embodiment, the data line 171 has a structure in which a width thereof becomes smaller in a region of the thin film transistor in the vicinity of an extension 175c' of the third drain electrode 175c such that an interval of the data line 171 from adjacent wiring is effectively maintained and signal interference between the data line 171 and the adjacent wiring is substantially reduced, but not being limited thereto.

A first passivation layer (not shown) is disposed on the data conductors 171, 173c, 175a, 175b and 175c and an exposed portion of the semiconductor 154. The first passivation layer may include an inorganic insulator such as silicon nitride (SiNx), silicon oxynitride (SiOxNy) and silicon oxide (SiOx), for example, or an organic insulator.

A color filter 230 is disposed on the passivation layer. Color filters 230 of the same color are disposed along pixels arranged in a same direction (e.g., a data line direction). Also, color filters 230 of different colors are disposed in pixels adjacent in a horizontal direction (e.g., a gate line direction), and adjacent color filters 230 may overlap the data line 171. The color filters 230 may display one of primary colors such as three primary colors of red, green and blue, for example, but not being limited thereto. In one alternative exemplary embodiment, for example, the color filters 230 may display one of cyan, magenta, yellow and white colors.

A light blocking member 220 (e.g., a black matrix) is disposed on the color filter 230. The light blocking member 220 is disposed in a region (hereafter referred to as "a transistor formation region") where the gate line 121, the thin film transistor and the data line 171 are disposed, and has a lattice structure having openings corresponding to a region where an image is displayed. The color filter 230 is disposed in the opening of the light blocking member 220. Also, the light blocking member 220 may include a material that blocks light.

A second passivation layer (not shown) is disposed on the color filter 230 and the light blocking member to cover the color filter 230 and the light blocking member 220. The second passivation layer may include an inorganic insulator such as silicon nitride (SiNx), silicon oxynitride (SiOxNy) and silicon oxide (SiOx), for example, or an organic insulator. According to an exemplary embodiment, where a step occurs due to a thickness difference between the color filter 230 and the light blocking member 220, the second passivation layer including an organic insulator substantially reduces or effectively removes the step difference.

A first contact hole 186a and a second contact hole 186b, which expose the first drain electrode 175a and extensions 175b' of the second drain electrode 175b, respectively, are formed through the color filter 230, the light blocking member 220 and the passivation layers. In such an embodiment, a third contact hole 186c, which exposes the protrusion 134 of the storage voltage line 131 and the extension 175c' of the third drain electrode 175c, is formed through the color filter 230, the light blocking member 220 and the passivation layers.

In an exemplary embodiment, where the contact holes 186a, 186b and 186c are formed through the light blocking member 220 and the color filter 230 by etching the light blocking member 220 and the color filter 230, the light blocking member 220 or the color filter 230 may be previously removed at the position corresponding to the contact holes 186a, 186b and 186c, as the light blocking member 220 or the color filter 230 may not be effectively etched together with the passivation layers due to the different layer characteristics thereof.

In an exemplary embodiment, the contact holes 186a, 186b and 186c may be formed by changing a position of the light blocking member 220 and etching only the color filter 230 and the passivation layers.

A pixel electrode including the first subpixel electrode 192h and the second subpixel electrode 192l is disposed on the second passivation layer. The pixel electrode may include a transparent conductive material such as ITO or IZO, for example.

In an exemplary embodiment, the first subpixel electrode 192h and the second subpixel electrode 192l are adjacent to each other in a column direction, have a substantially quadrangular shape, and include a cross-shaped stem including a transverse stem and a longitudinal stem crossing the transverse stem. In an exemplary embodiment, the first subpixel electrode 192h and the second subpixel electrode 192l are divided into four subregions by the transverse stem and the longitudinal stem, and each subregion includes a plurality of minute branches.

The minute branches of the first subpixel electrode 192h and the second subpixel electrode 192l form angles in a range of about 40 degrees to 45 degrees with the gate line 121 or the transverse stem. In an exemplary embodiment, the minute branches of two adjacent subregions may be substantially perpendicular to each other. In such an embodiment, a width of the minute branch may become gradually changes or intervals between minute branches may be different from each other.

The first subpixel electrode 192h and the second subpixel electrode 192l are physically and electrically connected to the first drain electrode 175a and the second drain electrode 175b through the contact holes 186a and 186b, and receive data voltages from the first drain electrode 175a and the second drain electrode 175b.

In an exemplary embodiment, a connecting member 194 that electrically connects the extension 175c' of the third drain electrode 175c and the protrusion 134 of the storage voltage line 131 through the third contact hole 186c is included such that a portion of the data voltage applied to the second drain electrode 175b is divided through the third source electrode 173c and thus the magnitude of a voltage applied to the second subpixel electrode 192l may become smaller than the magnitude of a voltage applied to the first subpixel electrode 192h.

In an exemplary embodiment, an area of the second subpixel electrode 192l may be greater than or equal to an area of the first subpixel electrode 192h and less than twice the area of the first subpixel electrode 192h.

In an exemplary embodiment, an opening for collecting gas discharged from the color filter 230 and an overcoat that covers the opening and including a material substantially the same as the pixel electrode 192 (collectively 192h and 192l) thereon may be provided on the second passivation layer. The opening and the overcoat have structures for blocking the gas discharged from the color filter 230 from being transferred to another element, but may be omitted in an alternative exemplary embodiment.

In such an embodiment, a microcavity 305 is defined on the second passivation layer and the pixel electrode 192, and a liquid crystal layer is disposed in the microcavity 305.

In such an embodiment, the upper structure above the microcavity 305 may be substantially the same as the structure shown in FIG. 1 to FIG. 4, and any repetitive detailed description thereof will hereinafter be omitted.

The position and structure of the wiring, the pixel electrode and the thin film transistor in the pixel of exemplary embodiment of a liquid crystal display is not limited to the exemplary embodiment shown in FIG. 37, but may be variously modified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a liquid crystal display, the method comprising:
   providing a pixel electrode on an insulation substrate;
   providing a sacrificial layer on the pixel electrode;
   providing a common electrode on the sacrificial layer;
   providing a photoresist layer on the common electrode;
   exposing a portion of the photoresist layer, common electrode and the sacrificial layer with light;
   developing the portion of the photoresist layer exposed with the light;
   etching a layer between the photoresist layer and the sacrificial layer using the developed photoresist layer as a mask to expose the portion of the sacrificial layer exposed with the light;
   removing the portion of the sacrificial layer exposed with the light;
   providing a roof layer on the insulation substrate and etching the roof layer to form a liquid crystal injection hole therein which exposes the sacrificial layer; and
   removing the sacrificial layer exposed through the liquid crystal injection hole to form a microcavity.

2. The method of claim 1, further comprising:
   providing a lower insulating layer between the common electrode and the photoresist layer,
   wherein the sacrificial layer, the common electrode and the photoresist layer cover the pixel electrode on the insulation substrate.

3. The method of claim 2, wherein
   the portion of the sacrificial layer exposed with the light corresponds to the liquid crystal injection hole and a column portion of the roof layer.

4. The method of claim 2, wherein
   the etching the layer between the photoresist layer and the sacrificial layer using the developed photoresist layer as a mask comprises:
   etching the lower insulating layer using the developed photoresist layer as a mask;
   removing the photoresist layer; and
   etching the common electrode using the etched lower insulating layer as a mask to expose the portion of the sacrificial layer exposed with the light.

5. The method of claim 4, further comprising:
   providing an additional lower insulating layer on the insulation substrate, before the providing the roof layer on the insulation substrate and the etching the roof layer to form the liquid crystal injection hole therein, and after removing the portion of the sacrificial layer exposed with the light.

6. The method of claim 4, wherein
   the providing the roof layer on the insulation substrate and the etching the roof layer to form the liquid crystal injection hole therein comprises:
   the providing the roof layer on the insulation substrate;
   exposing a portion of the provided roof layer corresponding to the removed portion of the sacrificial layer with light;
   developing the portion of the roof layer exposed with the light;
   providing an upper insulating layer on the insulation substrate to cover the developed roof layer; and
   removing a portion of the upper insulating layer corresponding to the removed portion of the sacrificial layer to form the liquid crystal injection hole.

7. The method of claim 1, wherein
the etching the layer between the photoresist layer and the sacrificial layer using the developed photoresist layer as a mask comprises:
etching the common electrode using the developed photoresist layer as a mask to expose the portion of the sacrificial layer exposed with the light; and
removing the photoresist layer.

8. The method of claim 7, wherein
the removing the photoresist layer comprises using an ashing process, and
the exposed portion of the sacrificial layer is partially removed by the ashing process.

9. The method of claim 8, wherein
the removed portion of the sacrificial layer by the ashing process is positioned under the common electrode.

10. The method of claim 7, further comprising:
providing an additional lower insulating layer on the insulation substrate, before the providing the roof layer on the insulation substrate and the etching the roof layer to form the liquid crystal injection hole therein, and after the removing the portion of the sacrificial layer exposed with the light.

11. The method of claim 7, wherein
the providing the roof layer on the insulation substrate and the etching the roof layer to form the liquid crystal injection hole therein comprises:
the providing the roof layer on the insulation substrate;
exposing a portion of the provided roof layer corresponding to the removed portion of the sacrificial layer with light;
developing the portion of the roof layer exposed with the light;
providing an upper insulating layer on the insulation substrate to cover the developed roof layer; and
removing a portion of the upper insulating layer corresponding to the removed portion of the sacrificial layer to form the liquid crystal injection hole.

12. The method of claim 7, wherein
the exposed portion of the sacrificial layer corresponds to the liquid crystal injection hole and a column portion of the roof layer.

* * * * *